US008326757B2

(12) United States Patent (10) Patent No.: US 8,326,757 B2
Paglin (45) Date of Patent: Dec. 4, 2012

(54) EMERGING MARKET BANKING SYSTEM

(76) Inventor: Renan C. Paglin, Ozone Park, NY (US)

(*) Notice: Subject to any disclaimer, the term of this patent is extended or adjusted under 35 U.S.C. 154(b) by 3585 days.

(21) Appl. No.: 10/372,561

(22) Filed: Feb. 24, 2003

(65) Prior Publication Data

US 2004/0006540 A2 Jan. 8, 2004

Related U.S. Application Data

(63) Continuation-in-part of application No. 10/095,998, filed on Mar. 12, 2002, now abandoned.

(51) Int. Cl.
*G06Q 40/00* (2006.01)
(52) U.S. Cl. ......................................................... 705/42
(58) Field of Classification Search ..................... 705/42
See application file for complete search history.

(56) References Cited

U.S. PATENT DOCUMENTS 5,717,989 A * 2/1998 Tozzoli et al. .................. 705/37

OTHER PUBLICATIONS

Securitization of future flow receivables: A useful tool for developing countries. Suhas Ketkar, Dilip Ratha. Finance & Development. Washington:Mar. 2001. vol. 38, Iss. 1, p. 46-49 (4 pp.).*
Future-Flow Securitization Rating Methodology. Christopher J. Donnelly, Rohinton B. Dadina, Michael C. Morcom. Duff & Phelps Credit Rating Co. Chicago:Mar. 1999.*
Asset Securitization and Structured Financing: Future Prospects and Challenges for Emerging Market Countries. Lakshman Alles. IMF Working Paper. Oct. 2001.*
"Offshore Financial Centers IMF Background Paper" Monetary and Exchange Affairs Department, Jun. 23, 2000.*
"Development Financing During a Crisis: Securitization of Future Receivables" by Ketkar and Ratha.*
Standard & Poor's, Gary Kochubka, Kevin Kime, "*Financial Future Flows Concept Penetrates Deeper into Emerging Markets*," (pp. 1-5) Mar. 11, 2002, New York, New York.
Standard & Poor's, Gary Kochubka, New York, Cesar Fernandez, Daniel Araujo, "*Dollar Diversified Payments Rights Finance Co.*" (pp. 1-14) Jun. 21, 2002, New York, New York.
Standard & Poor's, Kevin Kime, Gary Kochubka, Tamara Berenholc, "*Brazilian Diversified Payment Rights Finance Company*," (Banco Itau) (pp. 1-16), Jul. 10, 2002, New York, New York.
Fitch, Inc. Alexander MacKay, Adrian Dommisse, Vas Kosseris, Greg Kabance, Ben McCarthy, "*Diversified Payments Rights Criteria*," (pp. 1-5) Nov. 5, 2002, New York, New York.

(Continued)

*Primary Examiner* — Jessica Lemieux
(74) *Attorney, Agent, or Firm* — Ostrolenk Faber LLP

(57) ABSTRACT

A banking system for emerging market countries which includes a central flow control apparatus or system, is disclosed. The central flow control apparatus permits securitization of future flows receivables of two or more banks within an emerging market country. The central flow control apparatus may include an interface layer, an applications layer, and a presentation layer. The banking system may be comprised of a first bank account directly owned by a first emerging market bank and a second bank account which is owned by a trust (or other special purpose legal entity), wherein the emerging market bank is the beneficiary of the trust. The first bank account and the second bank account are bank accounts of a first international correspondent bank. The first bank account would typically be an onshore account which can be controlled by actions of a first emerging market government of the first emerging market country. The second bank account would typically be an offshore account which can not be controlled by actions of the first emerging market government of the first emerging market country.

4 Claims, 14 Drawing Sheets

OTHER PUBLICATIONS

Standard & Poor's, Ted Gogoll, "*Brazilian Securitization Market Preparing for Resurgence*," (p. 2) Nov. 13, 2002, New York, New York.

"*Brazilian Diversified Payment Rights Finance Company*" (Branco Itau), Standard & Poor's, Kevin Kime, Leo Brand, Tamara Berenhoic, (all pp. 1-14) Feb. 19, 2002, New York, NY.

"*S & P Rates its first future flow deal in El Salvador*" (Press Release), Standard & Poor's, Juan J. Flores, Angelica Bala, Gary Kochubka, all pages, Jan. 21, 2002, New York, NY.

"*Diversified Payments Rights Trust U.S. 300 million fixed-rate certificates Jan. 2001*," Standard & Poor's, Gary Kochubka, Cesar Fernandez, and Daniel Araujo, all pages (pp. 1-13), Nov. 8, 2001, New York, NY.

"*Under Pressure: Structured Transactions in Emerging Market Stress—Update 2001*," Fitch IBCA, Duff and Phelps, Greg Kabaance and Alexander Mackay, pp. 2 and 3, Jun. 18, 2001, New York, NY.

"*Banco National de Mexico. S.A. US$ Diversified Payment Rights Master Trust, Series Jan. 2001*," Mood's Investors Service, Susan C. Knapp, all pages, Mar. 14, 2001, New York, NY.

"*Securitization of Future Flow Receivables: A useful Tool for Developing Countries*," Finance and Development International Monetary Fund, Suhas Ketkar and Dilip Ratha, all (pp. 1-9), Mar. 1, 2001, Washington, D.C.

"*CCR Inc. MT-100 Payments Rights Master Trust Series 2001-A Certificates*," Moody's Investors Service, Maria I. Muller, all Pages, Jan. 10, 2001, New York, NY.

"*Rating Securities Backed by Future Financial Cash Flows*," Fitch IBCA, Duff and Phelps, Patrick Kerams, Suzanne Albers, and Alexander MacKay, all (pp. 1-16), Sep. 25, 2000, New York, NY.

"*New Bank Survivability Criteria Should Aid Emerging Market Financial Future Flow Issuers*," Standard & Poor's, Kevin Kime, Roger B. Tallon and Nancy GiganteChu, all pages, Sep. 13, 2001, New York, NY.

"*Moody's Approach to Rating Obligations Backed by Future Remittance Cash Flows*," Moody's Investors Service, Diana Weaver, all (pp. 1-12) Oct. 1,1999, New York, NY.

"*Future-Flow Securitization Rating Methodology*," Duff and Phelps Credit Rating Co., Duff and Phelps Credit Rating Co., (pp. 2, 7, 8, 9, and 10) Mar. 1999, New York, NY.

"*The Alchemy of Asset Securitization*", Stanford Journal of Law Business and Finance, Steven L. Schwarcz, pp. 4-5, Fall 1994, Stanford, CA.

"*Securitization of Future Flows*," Vinod Kothari, all pages, first published before Nov. 8, 2001.

"*Mexican Financial Future Flows Weathering Difficult Economic Times*," Standard & Poor's, Gary Kochubka, Juan J. Flores, Ingrid Amezquita, Cesar Fernandez and Maria Tapia, all pages, Sep. 17, 2002, New York, NY.

"*Brazilian Diversified Payment Rights Finance Company Floating Rate Series Feb. 2002 Notes Due 2003*," Moody 's Investor Service, Maria I. Muller and Celina Vansetti, all pages, Jul. 11, 2002, New York, NY.

"*Future Flow Transactions Best-Performing Structure in Argentina*," Standard & Poor's, Diane Audino, p. 1, Apr. 22, 2002, New York, NY.

"*Development Financing During a Crisis: Securitization of Future Receivables*," The Wold Bank Washington, D.C. 20433, Suhas Ketkar and Dilip Ratha, p. 27 is most relevant, Apr. 12, 2001, Washington, D.C.

"*New Bank Survivability Criteria Should Aid Emerging Market Financial Future Flow Issuers*," Standard & Poor's, Kevin Kime, Roger B. Taillon, and Nancy Gigante Chu, all pages, Sep. 13, 2000, New York, NY.

"*Future Flow Securitization in Asia*," Freshfields Bruckhaus Deringer, Clive Rough, all pages, Sep. 6, 2000, London, England.

"*Securitization of Financial Assets*," Holland and Knight LLP, Timothy C. Leixner, p. 2,3,7, Sep. 1, 1999, Fort Lauderdale, FL.

* cited by examiner

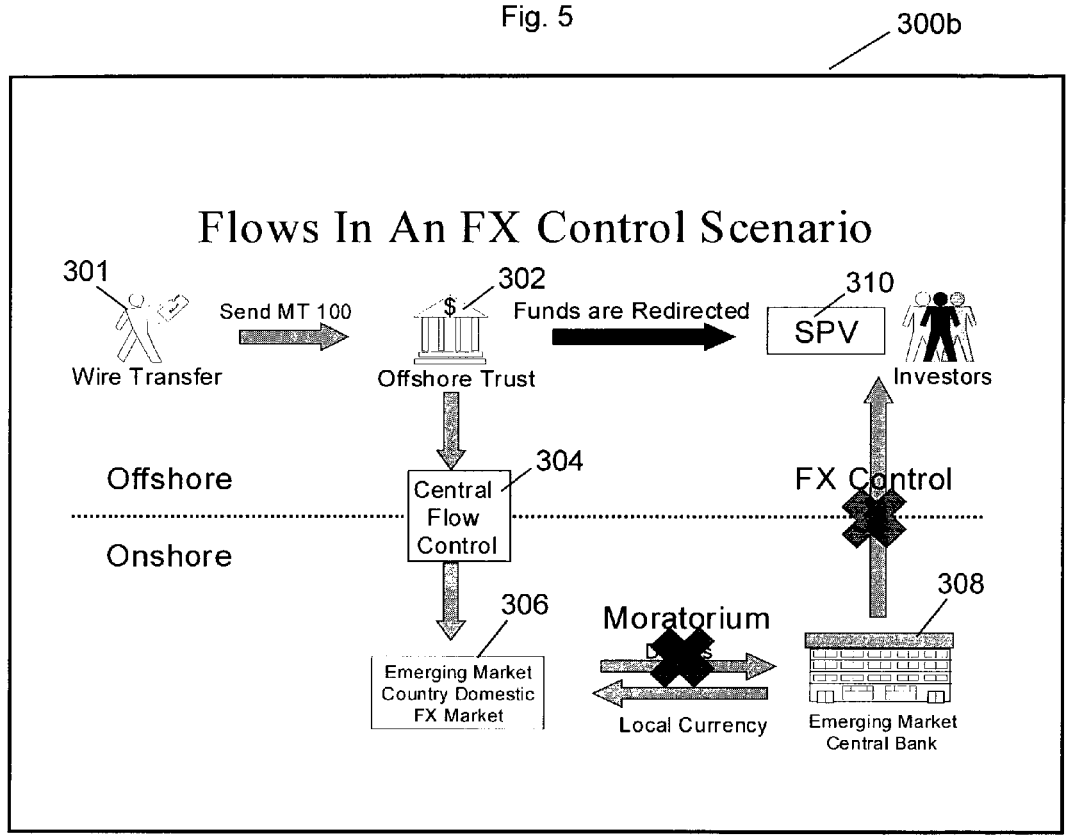

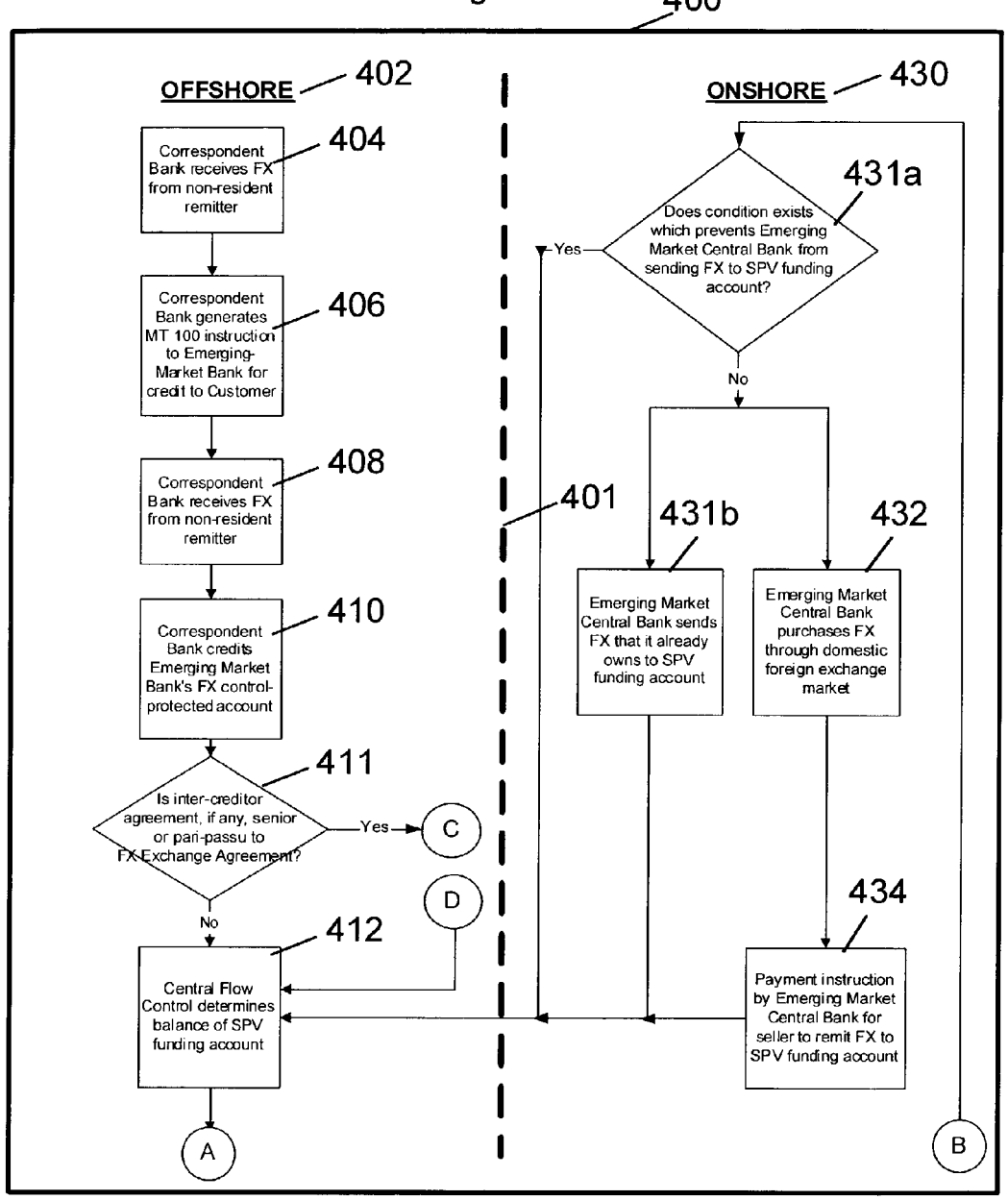

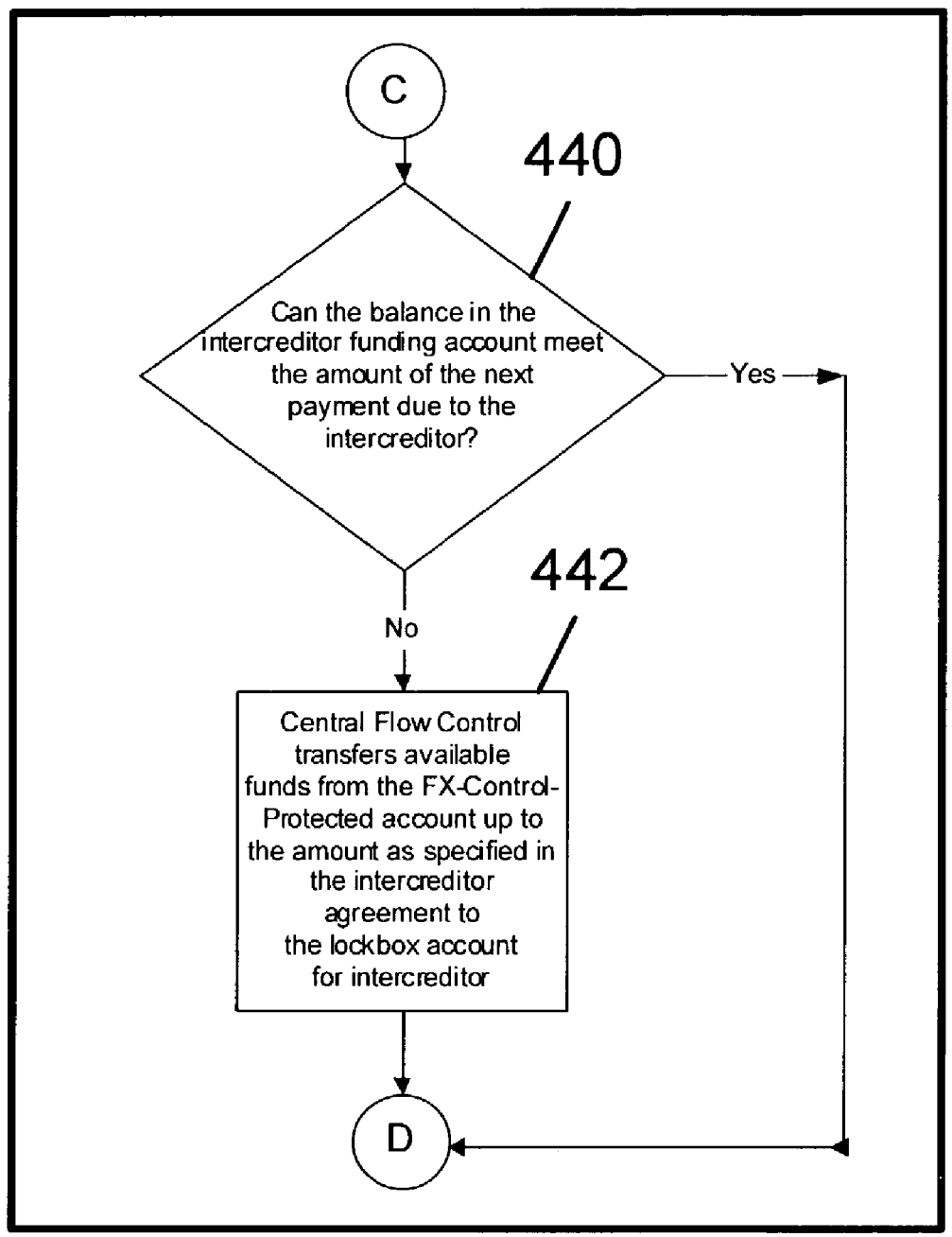

EMERGING MARKET BANKING SYSTEM

CROSS REFERENCE TO RELATED APPLICATION

This application is a continuation in part of and hereby claims the priority of parent patent application Ser. No. 10/095,998, titled, "Emerging Market Banking System", filed on Mar. 12, 2002 now abandoned, applicant and inventor, Renan C. Paglin.

FIELD OF THE INVENTION

This invention relates to future flow securitization and the international banking systems between banks chartered in emerging market countries and international correspondent banks.

BACKGROUND OF THE INVENTION

Since the late 1970s, securitization and other forms of structured financings have seen rapid growth in the capital markets of many developed countries. Under this field of finance, cash flow generating assets are transferred to and managed in special-purpose vehicles so as to protect the transferred assets from later interference by the transferor, its creditors or other third parties, which may try to claim the assets during the term of the financing. The special-purpose vehicles then issue fixed income securities such as certificates or bonds, which are sold to portfolio investors. The fixed income securities are backed by the cash flow generating assets and are often rated higher than the credit rating assigned to the transferor.

Securitization techniques have also been applied to borrowers from emerging market countries which seek to tap the deep capital markets of the developed market countries such as the United States and Western European countries. In this case, the objective of the special-purpose vehicles formed to hold the assets that are being securitized is to protect the assets not only from third party creditors but also from the sovereign government of that emerging market country. Sovereign governments have broad powers to freeze the movement of assets which are owned by parties under that sovereign's jurisdiction. Such risks, known as foreign exchange or capital control risks, are problematic to third-party investors located outside the sovereign's jurisdiction that rely on assets located within the sovereign's jurisdiction to recover their investment. This power of sovereigns has caused international credit rating agencies to adopt the concept of a sovereign ceiling, which is the highest credit rating that can be attained by any issuer within an emerging market country for any financial instrument backed by assets which exist within that sovereign government's jurisdiction.

Securitization is the process of aggregating similar assets, such as loans or mortgages, into a negotiable security. The assets being aggregated act as the collateral backing the negotiable security. A security is a kind of financial instrument. A category of securitization, which is referred to as future flow securitization, has been specifically developed for emerging market borrowers for the purpose of avoiding sovereign interference, as well as to protect the assets to be used for repayment from third party claimants. Future flow securitizations function by trapping assets in special purpose vehicles, which are referred to in this patent application as "offshore trusts". The assets to be trapped are known as future flow receivables which would normally be coming into the jurisdiction of the emerging market country. The special purpose vehicles then secure financing and by using the future flow receivables as collateral. Originally pioneered in the late 1980s by emerging market industrial companies in order to obtain lower-cost financing during an era when regular bond issuance was problematic because of sovereign debt moratorium which prevailed in many emerging markets, the technique of future flows securitization has been adopted by several emerging market banks to securitize receivables which originate from foreign jurisdictions especially developed market countries. Future flow receivables securitized by emerging market banks in the past have involved trade payment rights, credit card merchant vouchers signed by foreign visitors, remittances of overseas workers to their families, and receivables arising out of correspondent bank payment orders also known as diversified payment rights or SWIFT MT103 (formerly SWIFT MT100) transactions The first financial future flows transaction was executed by a Mexican bank in 1995. The capital markets have generally limited the transactions to the two or three largest local banks within an emerging market country because only the largest banks have been able to meet the credit rating agencies' criterion that it will be able to survive as a going concern in the future. Although there have been several future flow securitizations issued by banks in the past, these transactions were limited to pooling the future flow assets of a single bank.

Emerging market countries manage their financial payments with the rest of the world through a system of international correspondent banks. Other countries that trade with emerging market countries usually do not accept that country's local currency for trade payments. Acceptable payments are largely limited to the three major currencies (i.e., U.S. dollars, Japanese Yen or Euros). Accordingly, an emerging market banking system has to deal with foreign banks to manage its supply of foreign currencies used for transactions with the rest of the world. Foreign banks which hold deposits for the emerging market banks, and which transact on their behalf are called international correspondent banks. For example, the payment transactions which could give rise to the foreign exchange (or "FX" for short) to be used as collateral for the securitization financing include those that involve non-documentary trade payments, other payments for export of services, remittances of overseas workers, foreign direct investments, and dividend and interest income of residents in the emerging market country. The payment transactions to be used as collateral assets for the financial securitization originate from international correspondent banks, which perform payment and collection services for the emerging market. Together these international banks comprise the international correspondent banking system. The major international correspondent banks are headquartered in the Group of 7 (as defined by the International Monetary Fund) countries. The foreign-currency accounts with international correspondent banks used by emerging market banks to manage their trade transactions are called nostro accounts.

SUMMARY OF THE INVENTION

Unlike the prior art, the present invention, in one or more embodiments, will allow all banks within an emerging market country which have receivables originating from foreign sources, not just the two or three largest, to securitize their future flows in order to participate in a financing for their central bank or other similar entity and to share in the economic benefits from participation. The present invention will also allow any single bank which wishes to securitize its financial future flow receivables to do so by using apparatus and methods that will cause little or no interference with its existing operations, which is difficult, if not impossible, to accomplish using the prior art.

It is an object of the present invention in one or more embodiments to insert an electronic process between an emerging market country's banking system and the rest of the world.

It is another object of the present invention in one or more embodiments to permit pooling for securitization of the future flows of at least two emerging market banks within an emerging market country.

It is another object of the present invention in one or more embodiments to permit the collateral of future flows to be serviced for an intercreditor while future flows are in the pool.

It is another object of the present invention in one or more embodiments to allow future flows during a securitization to continue being deposited in the accounts of the emerging market bank at the same international correspondent banks that were used by the emerging market bank prior to the securitization.

This electronic process is enabled by a networked computer system, which is connected to the world's international correspondent banks through a data telecommunications network. The present invention also embodies new methods that will allow emerging market governments and government-controlled entities, in cooperation with banks comprising that country's banking system, to obtain financing from international investors at a lower cost of financing compared to conventional borrowing because the risk in the investment is reduced. The invention also allows international investors to finance emerging market governments and government-controlled entities more efficiently by improving the credit rating at which that investment can be made and expanding the flexibility of its ability to finance those borrowers. The present invention creates higher rated cash flows from a credit rating standpoint out of cash flows that would normally be lower rated. The present invention also protects and routes the promised cash flows to the investors, making the actual repayments of their investment possible and providing a higher level of assurance that they will get paid promptly and recover their investment.

Using the present invention, in one or more embodiment, an investor can provide financing to an emerging market central bank or government entity while using as collateral the future flow receivables of two or more banks operating within that emerging market jurisdiction. Investment bankers can also pool the future flows of two or more banks within a single emerging market jurisdiction to create a larger and more stable collateral pool. The reason for the greater stability of the pool as collateral compared to future flow collateral created in the prior art is the diversification of banks that process the flows so that in the event that one bank that has contributed future flows ceases to function, some or all of the flows routed through that bank will likely re-route themselves to the other banks represented in the collateral pool.

The present invention provides a central flow control apparatus or system which enforces certain contracts with bond investors entered into by certain participating banks in the emerging market country (an emerging market bank) so that its government, monetary authority or central bank can access international financing at favorable terms. This type of financing is commonly referred to as future flow securitization. The central flow control apparatus or system is an electronic technology that makes possible certain financial transactions and can therefore be classified as a financial technology.

The prior art was limited to enabling an individual emerging market bank to use future flow securitization to finance itself on a standalone basis. In the prior art, there was no apparatus or method to enable future flow securitization for two or more emerging market banks so that they could effectively pool their future flow receivables and obtain financing from international investors more efficiently by effectively acting as a single borrower, through the pooling of their future flow receivables as collateral. The present invention describes how to build and use such apparatus and methods to accomplish such purpose. In a future flow securitization, investors who have the right to receive the foreign currency funds from the offshore entities set up to own the future flow receivables, may be issued financial securities, such as notes or bonds, which will evidence their rights and which they may resell in the future. Purchasers of such financial securities may be solicited by an investment bank or securities underwriter. Thereafter, any purchaser of such financial securities may sell all or part of his holdings of such financial securities to a new party, who shall thereafter have the rights to receive the services enabled by the present invention. The present invention discloses methods whereby two or more emerging market banks contract to deliver foreign currency funds by pooling the foreign currency funds into a single offshore entity to be organized by those banks or through some provision that effectively achieves pooling such as the incurrence of joint-and-several obligations.

The banking system of an emerging market country is a very complicated system which uses many established methods for serving numerous customers located onshore and offshore. A very useful result provided by the present invention is to enable banks to implement large future flow securitizations while causing little or no disturbance to their existing operations. It should be noted that the present invention does not rule out standalone financing by an individual emerging-market bank, during its participation in the pooling of assets which is enabled by the present invention. Instead, the present invention permits a standalone financing whose collateral is limited to that particular bank's future flow receivables while allowing the standalone financing to co-exist with a separate financing against a pool which is comprised of that bank's future flows together with the future flows of other banks. The present invention is compatible with standalone financings which have been the only type of financings permitted by the prior art. The standalone financing can also be assigned a credit rating by credit rating agencies which is distinct and separate from the credit rating of the financing enabled by the present invention because the former uses only a subset of the pooled future flows as collateral. The rating assigned to the two financings will likely be different. The following are definitions of terms used in the present application:

"FX Purchase Agreement" as used in the present application includes any contract comprised of one or more agreements wherein at least one party organized offshore agrees to deliver to the order of at least one other party organized onshore certain foreign currency funds (meaning a currency other than that of the emerging market country) in consideration of value to be delivered by the party organized onshore. The exchange of value between parties may be simultaneous such as a conventional spot or forward foreign exchange transaction, or it may not be simultaneous as in the case of a loan transaction for example.

"FX" as used in the present application is an abbreviation of "foreign exchange".

"International correspondent bank" as used in the present application refers to any financial service provider that is licensed and operating under a jurisdiction outside that of an emerging market country and which accepts foreign currency funds for deposit to the account and order of an emerging market bank.

"Account" when used in the present application shall mean the setting aside of a sum of money recorded in the accounting system of a financial fiduciary such as a bank, which can be referenced by a permanent or temporary account number, or by a descriptive name associated with the owner of such account, who shall have the right to order the financial fiduciary to perform certain transactions, payment for which shall be settled by charging that account.

"Investor" when used in the present application shall include guarantors.

"Intercreditor" means one or more investors or guarantors in a financing collateralized by some, but not all, of the future flow receivables, which collateralize a financing enabled and disclosed by one or more embodiments of the present invention.

"Intercreditor Agreement" means an agreement between the Intercreditor and the Investor(s) in a financing enabled and disclosed by the present invention, which provides whether the rights of the Intercreditor are senior, pad passu, or subordinate to the rights of the Investor with respect to those future flow receivables which are the subject of the Intercreditor Agreement.

"Central bank" or "Emerging Market Central Bank" as used in the present application refers to any emerging market central bank or monetary authority, emerging market government, emerging market government owned or controlled entities, or any emerging market entity that is so dominant in its market that two or more banks agree to effectively pool resources to finance such entity.

"Offshore" as used in the present application refers to outside the jurisdiction of the emerging-market government.

"Onshore" as used in the present application refers to within the jurisdiction of the emerging-market government.

"Trust Entity" as used in the present application, shall mean any special purpose legal entity organized to own the future flow receivables of an emerging market bank or banks.

"Offshore Trust" shall mean a Trust Entity organized Offshore

The present invention distributes the FX-control-protected accounts throughout the international banking system wherever depository or custodian institution and whenever the participating emerging market banks, which originate the future flow receivables, set up their accounts to handle those receivables. Since the present invention allows that the participant's original account be matched with a specific FX-control-protected account to be handled by one or more embodiments of the present invention in a very convenient manner, the present invention causes little or no interference with the present business process of the participants. Accordingly, this condition of zero interference allows several participants to pool their receivables to effectively act as one originator whereas before the present invention such an arrangement would be too disruptive on their business to even consider. The best use of this ability is for the members of an emerging banking system to pool all of their receivables acting effectively as one securitization issuer for the benefit of their government. If there is another customer other than the government whose credit is acceptable to more than one participant, those participants can also use the present invention so as to pool their resources to effectuate a securitization financing for that customer. A single participant or originator can also use the present invention to minimize the interference of this kind of financial structure on its pre-existing operations as compared to the interference caused by the prior art practice of centralizing collections in one or a few trustee banks.

The present invention in one or more embodiments discloses a banking system comprising a first bank account directly owned by a first emerging market bank chartered under the laws of a first emerging market country and a second bank account which is owned by a trust or other similar special purpose legal entity, wherein the first emerging market bank is the beneficiary of the trust or other similar special purpose legal entity. The first bank account and the second bank account are bank accounts at a first international correspondent bank. The first bank account would typically be an onshore account which can be controlled by actions of a first emerging market government of the first emerging market country. The second bank account would typically be an offshore account which can not be controlled by actions of the first emerging market government of the first emerging market country.

The banking system may be further comprised of a central flow control apparatus which can administer the first and second bank accounts. The central flow control apparatus may be comprised of an interface layer, an applications layer, and a presentation layer. Each of these layers may be comprised of one or more processors, computers, or computer processors for performing various functions. For example the interface layer may be comprised of interface processors each of which interfaces with an electronic banking system of the first international correspondent bank. The applications layer may be comprised of applications processors each of which receives an interface object from an interface processor. The applications layer may also be comprised of applications processors, which interface with transaction data information residing in a database processor. The presentation layer may be comprised of presentation processors, each of which also receives an interface object from an interface processor.

The interface object may be comprised of a first code referring to the first international correspondent bank, a second code referring to the first emerging market bank, and a third code referring to the second bank account. Each of the applications processors may store all activities which access the first or the second bank account in a database. Each of the applications processors may route FX funds available in the second bank account according to a decision criteria specified in a FX purchase agreement between an emerging market central bank and the trust or special purpose entity owned by the first emerging market bank. Each of the presentation processors may report aggregate activity for the first and second bank accounts. Each of the presentation processors may report aggregate monthly cash flow coverage statistics concerning the first and second bank accounts to the emerging market central bank of the emerging market country or to a credit rating agency. These reporting functions can occur electronically in any known manner, such as through a private data network, by wireless, by fiber optics or by any other electronic communication method.

The present invention in one or more embodiments also discloses a method comprising the steps of setting up a first bank account directly owned by a first emerging market bank chartered in a first emerging market country and setting up a second bank account which is owned by a trust or a similar special purpose entity wherein the first emerging market bank is the beneficiary of the trust or special purpose legal entity. The first bank account and the second bank account are typically bank accounts at a first international correspondent bank. The first bank account is typically an onshore account which can be directly or indirectly controlled by actions of a first emerging market bank or the government of the first emerging market country, and typically the second bank account is an offshore account which can not be controlled by actions of the first emerging market bank or the government of the first emerging market country. The first and second bank accounts can be administered through a central flow control apparatus.

The preferred embodiment is an all-electronic fully automated apparatus which would function without human intervention. However other embodiments can be constructed with combinations of manual process and electronic communications such as telex, telefax, e-mail or telephone to accomplish the methods claimed.

BRIEF DESCRIPTION OF THE DRAWINGS

FIG. 5 shows a diagram of the flow of monetary funds in a foreign exchange control scenario in a banking system in accordance with the first or second embodiments of the present invention; and FIGS. 6A, 6B and 6C show a flow chart of a method for handling daily monetary funds in accordance with the first or second embodiments of the present invention;

DETAILED DESCRIPTION OF THE DRAWINGS

Figure 1:
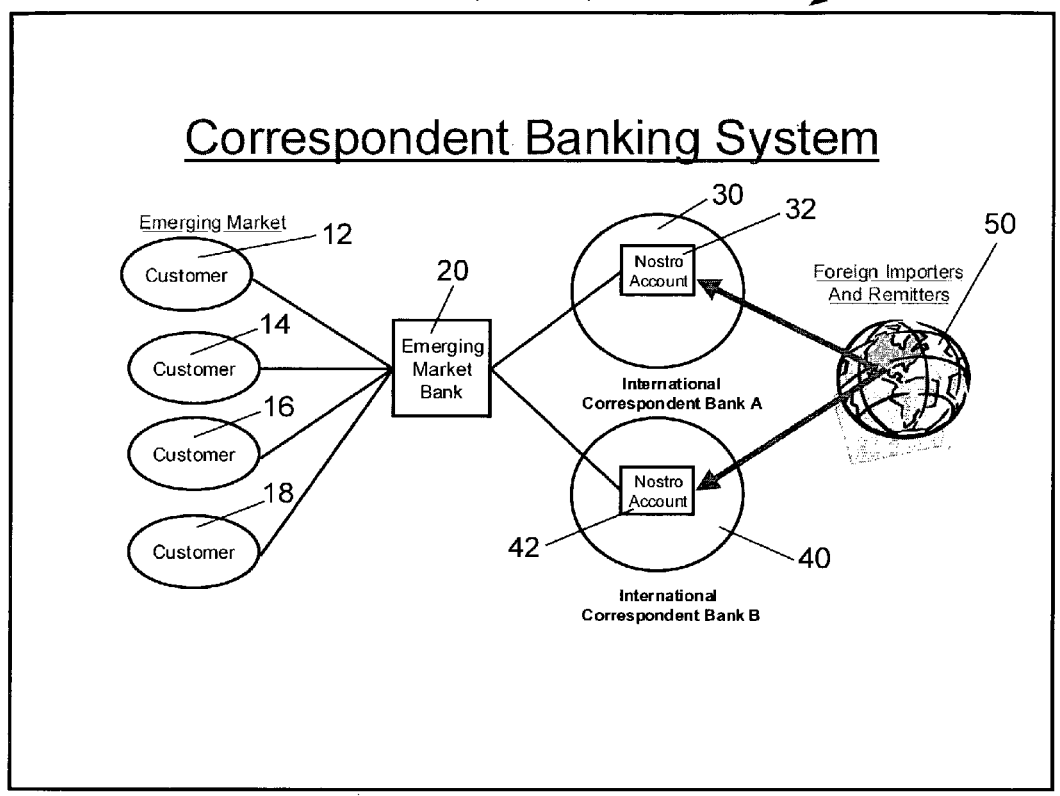
FIG. 1 shows a diagram of a prior art banking system between an emerging market bank and a plurality of international correspondent banks.

FIG. 1 shows a diagram of a prior art banking system 10 between an emerging market bank 20 based in an emerging market country and international correspondent banks 30 and 40. The emerging market bank 20 may receive funds for customers 12, 14, 16, and 18, from foreign remitters 50 of foreign exchange ("FX") (such as currency foreign to the emerging market country). The foreign remitters 50 reside outside the emerging market country such as 50. The customers of the emerging market bank 20 may be local customers who reside in the emerging market country in which the emerging market bank 20 is chartered. The international correspondent banks 30 and 40 operate in various countries which may include the emerging market country in which the emerging market bank 20 is chartered. The emerging market bank 20 may maintain one or more "nostro accounts" in international correspondent bank 30 and 40 such as "nostro account" 32 and 42. As previously described, a "nostro" account is an account of an emerging market bank, such as emerging market bank 20, with an international correspondent bank, such as bank 30, into which hard currency deposits can be made, for the purpose of managing the emerging market bank's payment and collection transactions with foreign parties who reside outside the emerging market country. A "hard currency" is the currency of one of the major industrial nations such as the United States of America.

In the real world, relationships with only two international correspondent banks, such as banks 30 and 40, would be a small number for most emerging market banks. Large emerging market banks typically have between several dozen to several hundred international correspondent banking relationships.

Figure 2:
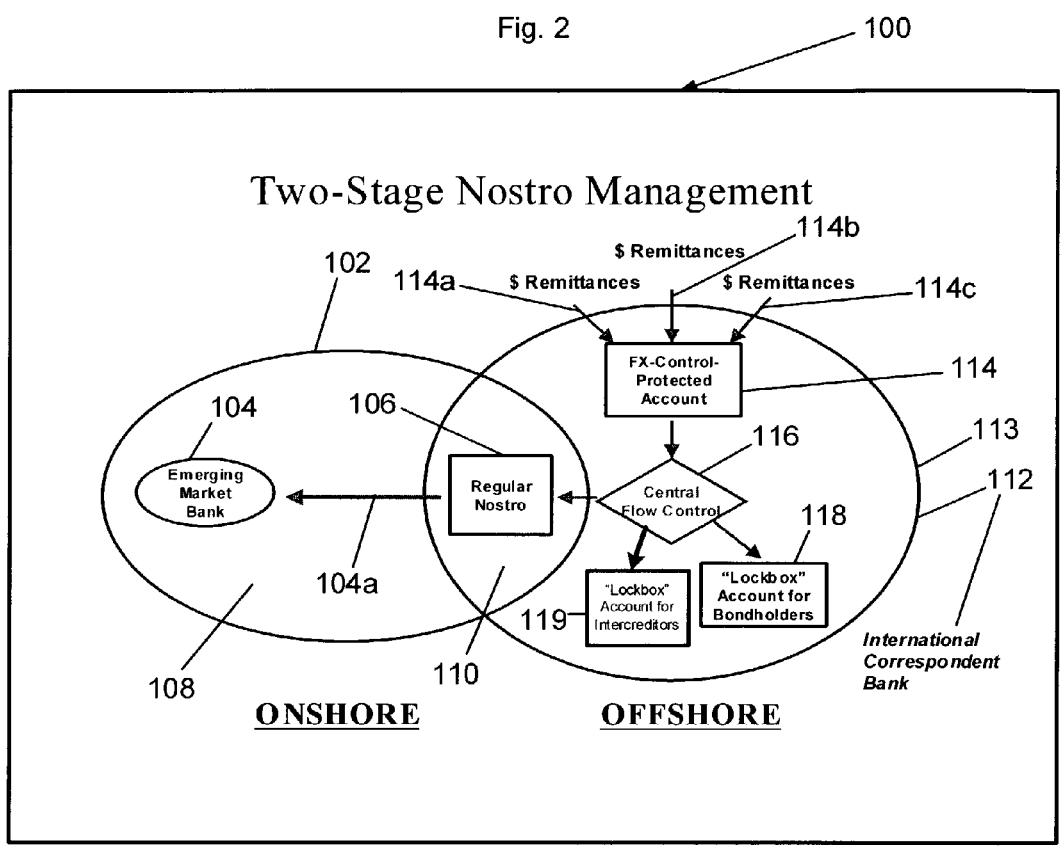
FIG. 2 shows a diagram of an overview of a banking system in accordance with a first embodiment of the present invention.

FIG. 2 shows a diagram of an overview of a banking system 100 in accordance with a first embodiment of the present invention. In the banking system 100, in addition to the prior art "nostro" account 106, a FX-control-protected account 114, a central flow control apparatus 116, a lockbox account for intercreditors 119 and a lockbox account for bondholders 118 is also shown. The initials "FX" in "FX-control protected account" "foreign exchange". The FX control-protected account 114 is an account owned by an offshore trust (or other similar special purpose legal entity) set up to legally own the remittances such as 114a, 114b, and 114c of which emerging market bank 104 is the beneficiary. The area inside an ellipse 102 represents an account or a bank that is located in the emerging market country and/or subject to the control of the government of the emerging market country. The emerging market bank 104 and a regular nostro account 106 are shown inside the ellipse 102. As an example, the emerging market bank 104 may be a local bank whose physical and legal headquarters is in the Philippines. The regular nostro account 106 may be a bank account at international correspondent bank 112 (organized outside the emerging market country where emerging market bank 104 resides) which is directly owned by and in the name of the emerging market bank 104. The international correspondent bank 112 will usually be headquartered in a developed country, such as the United States of America or other member country of the "Group of 7" (also known as G7) countries grouped by the International Monetary Fund. The area inside the ellipse 113 represents accounts or apparatus administered by the international correspondent bank 112 but which may be subject to government supervision of a country other than the emerging market country because the international correspondent bank 112 is based in that other country. The FX-control-protected account 114 is shown in ellipse 113, along with the central flow control apparatus 116 and the lockbox account for bondholders 118. The lockbox account for bondholders 118 is usually established in the same international correspondent bank 112 as where the FX-control-protected account 114 is established; however, it is also possible for the lockbox account for bondholders 118 to be established in another offshore bank.

The intersecting area of ellipses 102 and 113, in which is located the regular nostro account 106, represent bank accounts which are administered by the international correspondent bank 112 but which are subject to the direct or indirect control of the government of the emerging market country. The international correspondent bank 112 is capable of receiving remittances from any entity who is not a resident of the emerging market country, in an electronic or computerized manner, or otherwise, via the inputs 114a, 114b, and 114c to the FX-control-protected account 114. The FX-control-protected account 114 may electronically communicate with central flow control apparatus 116 which may electronically communicate with lockbox account for bondholders 118 and also with lockbox account for intercreditors 119. The regular nostro account 106 may electronically communicate with the central flow apparatus 116. The regular nostro account 106 may also electronically communicate with the emerging market bank 104.

The reference in FIG. 2 to "ONSHORE" refers to the ellipse 102 and to accounts owned by banks or bank branches physically located in the emerging market country and/or subject to the direct or indirect control of the government of the emerging market country. The reference in FIG. 2 to "International Correspondent" bank refers to the contents of ellipse 113.

For an emerging market bank, such as bank 104 in FIG. 2 to participate in the banking system 100, the emerging market bank 104 would establish a trust entity under foreign law. The trust entity need not be formally organized as a trust. It can be organized as another form of entity such as a corporation, as long as it is formed for a special purpose so that it will be protected from bankruptcy risks. However, for convenience, the term "trust" is used to refer to this entity although the invention should not be limited to legally organized trusts and should work with any form of special purpose entity commonly utilized for financial securitizations. For example, in the previous example, the emerging market bank could establish a trust entity under the law of the Cayman Islands. The FX-control-protected account 114 is an example of an FX account owned by such a trust entity. The emerging market bank 104 would be the beneficiary of the trust and an international correspondent bank, such as bank 112 in FIG. 2, would be the depository bank where the trust would deposit its FX assets credited by the international correspondent bank such 112.

Through the trust, the emerging market bank 104 can beneficially, rather than directly, own the foreign currencies (foreign to the emerging market country) received from residents of other countries The transfer of the foreign currency receivables from the emerging market bank 104 to the offshore trust or the FX-control-protected account 114 is based on a true sale under the law of the emerging market country. True sale is required so that the foreign currencies cannot be consolidated with accounts directly owned by the emerging market bank 104 in the event that the emerging market bank 104 becomes insolvent and falls under the jurisdiction of a bankruptcy proceeding.

The trust or FX-control-protected account 114 is organized offshore (outside the jurisdiction of the government of the emerging market country) so that the government of the emerging market country cannot force the trust to surrender its foreign currency assets or to violate any contracts with third parties. Because these offshore trust accounts are structured to be protected from controls imposed by the government of the emerging market country on the convertibility of its local currency into hard currency such as U.S. dollars or the remittance of such hard currency to outside parties, these trusts are referred to in this disclosure as foreign-exchange control protected (or "FX-control-protected"), a description that is derived from the term "foreign-exchange control", which means a government-declared suspension of convertibility of local currency to foreign currency, which may nor may not accompany a general or selective moratorium on the servicing of foreign debt obligations. A condition of FX control is often accompanied by capital control which is regulation that prevents the transfer of onshore funds offshore to parties which previously invested into the emerging market country. The description of FX-control-protected should not be understood to exclusively mean protection from debt moratorium.

In general, the offshore trust or FX-control-protected account 114, if validly established under a foreign jurisdiction (i.e., offshore to the emerging market country, i.e. in this example could mean in the United States), and the FX-control-protected account such as 114 owned by an offshore trust should protect the foreign currency assets in the account 114 from any form of FX control or capital control imposed by the government of the emerging market country, including but not limited to general or selective moratorium on debt servicing by public or private entities in the emerging market country.

Once the emerging market bank 104 has established an offshore trust account or FX-control-protected account 114 to beneficially own future foreign-currency assets that it would have previously owned directly, each of its nostro accounts, such as nostro account 106, at international correspondent banks, such as at international bank 112 can be bifurcated into two accounts, namely the FX-control-protected account 114 and the original nostro account 106. In certain instances where there may be intercreditors relying on the same future flow receivables directed to the FX-control-protected account 114, the present invention can manage one or more accounts for intercreditors such as "lockbox" account 119 established in international correspondent bank 113. An account such as 119 can receive funds from the FX-control-protected account 114 before any funds in the FX-control-protected account 114 are transferred to the nostro account such as 106. In similar fashion, the offshore trust can open a new FX-control-protected account 114 with each of its pre-existing correspondent bank relationships, to operate as a pair together with its regular nostro account 106. The FX-control-protected account 114 will then be enrolled or implemented with the central flow control apparatus 116 which can then enforce contracted cash movements between the FX-control-protected account 114 and the bank's regular nostro account 106 as illustrated in FIG. 2. Through the central flow control apparatus 116, a pair of accounts (such as account 114 and 106) can be tightly linked so that the accounts 106 and 114 have to a large degree the same convenience of one account for the emerging market bank 104. The central flow control apparatus 116 can also monitor and enforce the contractual cash flows promised by the emerging market banks, such as bank 104 (acting through their offshore trusts) to non-resident investors.

Simultaneous with the opening of the FX-control-protected account 114, the international correspondent bank 112 signs a contract such as a notice and acknowledgement agreement which binds the international correspondent bank 112 into depositing all future foreign currency (i.e., a currency other than that of the emerging market country) receipts, typically those generated by the Society for Worldwide Interbank Financial Telecommunications ("S.W.I.F.T.") network (an internationally standardized high-speed telecommunications network for sending and receiving financial messages) and classified as MT-100 transfers, which are electronic messages under the so-called MT100 standard and which are sent to an emerging market bank by a foreign bank instructing the former to on-credit an account of a customer who resides in the emerging market country. The international correspondent bank 112 can readily identify the underlying transactions so that it can automatically post these amounts to the appropriate accounts of customers.

FIG. 2 represents the accounts with respect to a single international correspondent bank such as 112 and a single emerging market bank such as 104. Since in reality there are many relationships between international correspondent banks and emerging market banks, the account relationships portrayed in the banking system 100 can be repeated for each such similar relationship.

The present invention in one or more embodiments is a passive, non-invasive system for the emerging market banks, such as bank 104 in FIG. 2. It works without interfering with the banks' normal activities in the foreign exchange market, their business processes (i.e. treasury management and operations) or established customer and correspondent banking relationships. The banks that participate will not be required to close their nostro accounts, such as account 106, or to consolidate their funds in a master account with a separate bank as in traditional financial securitizations. Passive involvement from the emerging market banks, and non-disturbance of their business are accomplished by establishing a technologically enabled legal structure between the emerging market banks and the rest of the world.

Figure 3:
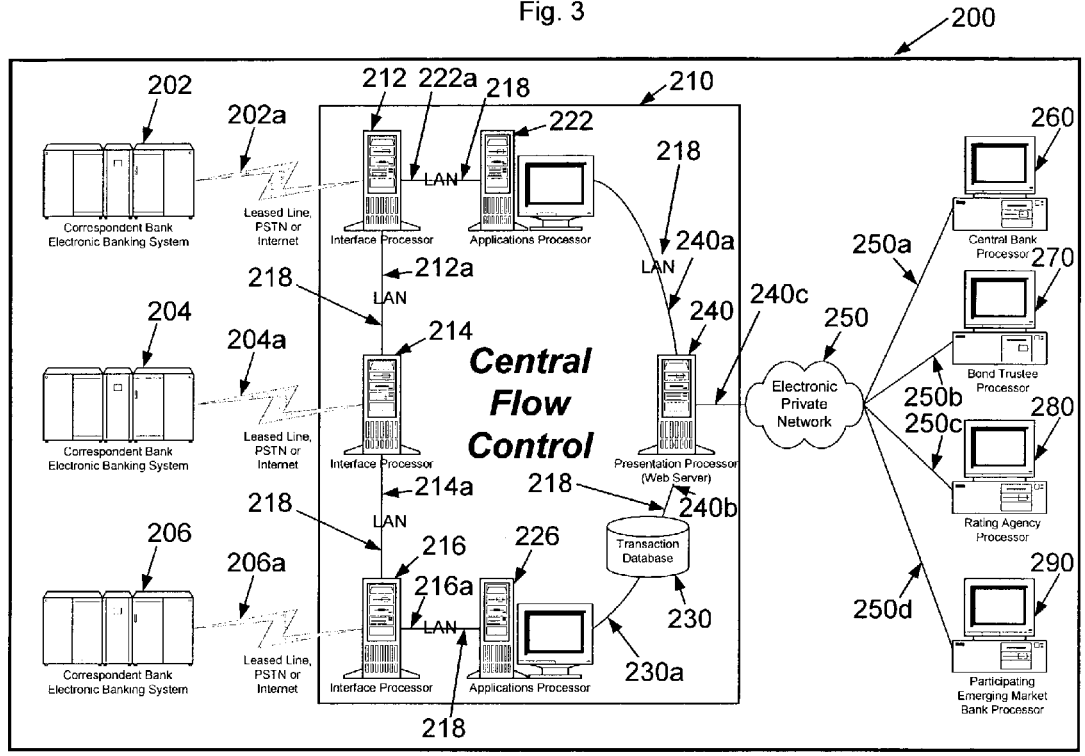
FIG. 3 shows a diagram of a detailed embodiment of a banking system in accordance with a second embodiment of the present invention.

FIG. 3 shows a diagram of a detailed embodiment of a banking system 200 in accordance with a second embodiment of the present invention. The banking system 200 includes correspondent bank electronic banking systems 202, 204, and 206, interface processors 212, 214, and 216, applications processors 222 and 226, transaction database 230, presentation processor 240, electronic private network 250, central bank processor 260, bond trustee processor 270, rating agency processor 280 and participating emerging market bank processor 290.

Each of the correspondent bank electronic banking systems 202, 204, 206 may be part of an international correspondent bank, such as bank 112 of FIG. 2. Each of the correspondent bank electronic banking systems 202, 204, and 206 may be electronically connected via the leased line, publicly switched telephone network ("PSTN") or Internet communication links 202a, 204a, and 206a respectively, or by any other communication links such as wireless links to interface processors 212, 214, and 216 respectively. Each of correspondent bank electronic banking systems 202, 204, and 206 may include one or more computers or computer processors. Each of the correspondent bank electronic banking systems 202, 204, and 206 may be part of a different correspondent bank such as for example: Citibank (TRADEMARKED), PNC Bank (TRADEMARKED), and the Bank of New York (TRADEMARKED), respectively. Each of interface processors 212, 214, and 216, each of the applications processors 222 and 226, and the presentation processor 240 may also include one or more computers or computer processors. The transaction database 230 may include computer memory.

The interface processor 212 may be electronically connected to interface processor 214 via communication link 212a. The interface processor 214 may be electronically connected to interface processor 216 via communication link 214a. The communication links 212a and 214a may be part of a local area network (LAN) 218. The interface processor 212 may be electronically connected to applications processor 222 via communication link 222a. The interface processor 216 may be electronically connected to applications processor 226 via communications link 216a. The communication links 222a and 216a may be part of the local area network 218.

The applications processor 222 may be electronically connected to the presentation processor or web server 240 via communications link 240a. The applications processor 226 may be electronically connected to the transaction database 230 by communication link 230a, and the transaction database 230 may be electronically connected to the presentation processor 240 by communication link 240b. The communication links 230a, 240a, and 240b may be part of the local area network 218.

The presentation server 240 may be electronically connected via a communication link 240c to a private electronic communication network 250, such as the General Electric (TRADEMARKED) private network. The communication network 250 may include one or any combination of communication links such as hardwired, wireless, optical, or any other. The network 250 may be electronically connected to a central bank processor 260 via a communication link 250a, to a bond trustee processor 270 via a communication link 250b, to a rating agency processor via a communication link 250c, and to a participating bank processor 290 via a communication link 250d. Each of the processors 260, 270, 280, and 290 may each actually contain one or more computer processors, or one or more other type of electronic, optical, or other known processors.

Components such as the interface processors 212, 214, and 216, the applications processor 222 and 226, the transaction database 230, the presentation processor 240, and the communication links which link these components together are part of a central flow control apparatus or system 210 as shown in FIG. 3.

The central flow control apparatus or system 210 can be thought of as being implemented in three layers. The lowest layer, is called the "interface layer", and may be comprised of or can be implemented in, for example, computer software programmed in interface processors, such as the interface processors 212, 214, and 216 shown in FIG. 3.

The interface layer automates cash movement functions between accounts existing within a single correspondent bank electronic banking system, such as single correspondent bank electronic banking system 202 (which may be part of Citibank (TRADEMARKED), for example). The account within a single correspondent bank electronic banking system, such as system 202, may include a FX-control-protected account, like account 114, a regular nostro account, like account 106, and, as will be explained later, a "lockbox" account, like account 118, with the particular correspondent bank (such as Citibank (TRADEMARKED) in this example) established for the benefit of investors. Once this Interface Layer has been built or programmed into the interface processor 212 for banking system 202, it can handle all the participating emerging market banks (such as emerging market bank 104) that have nostro accounts with any given correspondent bank or electronic banking system of a correspondent bank (such as banking system 202 of Citibank). FIG. 3 shows only three electronic banking systems but there can be any number of such systems interconnected through an interface processor, such as 202, 204 and 206, with the present invention as may be required by the users.

The next layer, can be called an "applications layer", and this layer is responsible for aggregating the balances and flows for each participating emerging market bank, such as bank 104, and its correspondent international banks (such as international bank 112). The applications layer may be comprised of or can be implemented by computer software programmed into applications processor 222 and 226. The applications layer will make the funds transfer decisions that will be applied to each account depending on the rules specified in a FX (foreign exchange) purchase agreement, which is an agreement between the offshore trust and the emerging market central bank where the emerging market central bank obtains hard currency from the offshore trust.

Finally, the last layer will be a "presentation layer", which will be responsible for delivering reports and interacting with the various constituencies of the securitization program, which include participating emerging market banks (such as bank 104), an emerging market central bank, a bond trustee and rating agencies, which monitor the emerging market country's credit standing for investors. The presentation layer may be comprised of or can be implemented by computer software programmed into presentation processor 240.

A general overview of the interface layer, the applications layer, and the presentation layer is as follows.

(1) The Interface Layer:
Interfaces with an electronic banking system of an international correspondent bank such as system 202 in FIG. 3 and provides programmable interface object (such as those available in Java, a programming language) to the application and presentation layer;
Logs-in to international correspondent bank system, such as system 202 using that bank's security protocol;
Links various accounts within a given international correspondent bank system, such as within system 202;
Initiates Wire Transfer Money Request (Lockbox account, such as account 118 to Bond Fiscal Agent, which may be an account outside the correspondent bank such as 112)

(2) Application Layer:
Stores all activity accessing accounts in a relational database, such as database 230 in FIG. 3;
Routes funds available in FX-control-protected accounts, such as account 114 according to decision criteria specified in the foreign exchange purchase agreement between the emerging market central bank, such as bank 308 in FIG. 4 and offshore trusts such as trust that owns FX-control-protected account 114 at international correspondent bank 112 in FIG. 2; and
Flags down all exceptions that need operator intervention.

(3) Presentation Layer:
Reports aggregate activity applicable to any given participating emerging market bank such as bank 104;
Reports aggregate monthly cash flow coverage statistics to the emerging market central bank such as bank 308 having a processor 260 and the rating agencies at, for example, processor 280 in FIG. 3; and
Reports daily and monthly status of collections for investors to for, example, bond trustee processor 270.

The interface layer will typically support at least three major functions. The implementation of these three major functions should be customized for each international correspondent bank (such as bank 112) as different international correspondent banks use different methods for customers such as bank 104 in FIG. 2 to electronically access their accounts. The three major functions to be supported by the interface layer through computer software programmed into one or more interface processors, such as interface processors 212, 214, and 216 of FIG. 3, are:

(1) Ability to respond to balance information queries (concerning at least a nostro account, like account 106 in FIG. 2 and a FX-control-protected account, like account 114 in FIG. 2),
(2) Ability to respond to account activity queries (again concerning at least a nostro account and a FX-control-protected account), and
(3) Ability to transfer money from the FX-control-protected account to other accounts on a real-time basis (again concerning at least a nostro account and a FX-control-protected account).

Initially, the major international correspondent banks, such as bank 112, which handle the bulk of the foreign currency (i.e. not the emerging market country's currency, U.S. dollars would be an example of a foreign currency) cash flows of the emerging market country, will be supported by the central flow control apparatus 210 shown in FIG. 3. The number of correspondent bank electronic banking systems can be increased from three (202, 204, and 206) shown in FIG. 3, to any number. Similarly the interface processors can be increased from three to any number, the applications processors 222 and 226 can be increased from two (222 and 226) to any number. Eventually, the central flow control apparatus or system 210 may have a sufficient number of interface processors, application processors, presentation processors and other components to expand coverage to all of the international correspondent banks in the world with material standing in the international correspondent banking industry. More than one transaction database, like database 230, or more than one presentation processor 240 may also be used, or database 230 itself may be comprised of more than one database and presentation processor 240 itself may be comprised of more than one processor.

Several functions may be supported by central flow control apparatus 210 at the higher level, called the applications layer, which may be implemented in for example, applications processors 222 and 226 in FIG. 3. These functions may be implemented by accessing programmable objects provided by the interface Layer, which manage the FX-control-protected accounts at the various international correspondent banks. The functions that may be supported at the applications layer, through for example applications processors 222 and 226 are:

(1) Aggregation of the deposit activity of all the FX-control-protected accounts directly owned by the respective offshore trusts established for the emerging market banks (such as bank 104, which may have a participating emerging market bank processor 290 in FIG. 3) that use the central flow control apparatus or system 210 of FIG. 3.
(2) Aggregation of the available balances of all the FX-control-protected accounts directly owned by the respective offshore trusts established for the emerging market banks (such as bank 104) that use the central flow control apparatus 210 of FIG. 3.
(3) Ascertainment of whether scheduled payments have been made by the originator (emerging market central bank, the central bank processor 260 may be part of the emerging market central bank) of the financial securitization.
(4) Distribution of funds from the various FX-control-protected accounts (such as account 114) to either the regular nostro account (such as account 106) or the investors' lockbox account (such as account 118), depending on whether the originator or emerging market central bank or central bank processor 260 has made scheduled payments into the particular international correspondent bank electronic banking system, such as for example system 202, (or via non electronic means into the corresponding international correspondent bank) and according to an allocation formula to be specified by contract between the originator (for example, emerging market central bank having central bank processor 260)

and the participating emerging market banks (for example, emerging market bank 104 having participating bank processor 290)

(5) Electronic reporting functions of the above activities to the participating emerging market banks (for example emerging market bank 104 having participating bank processor 290) and to the rating agencies (for example, rating agency processor 280 in FIG. 3).

(6) User identity and validation systems using a public-key-infrastructure certification standard to be agreed upon by the emerging market central bank, and the participating emerging market banks, which will support various levels of authorization to access the central flow control apparatus or system 210.

Most of the international correspondent banks, such as bank 112 having electronic banking system 202, already provide back-office implementation of the functionalities required by the Interface layer of the system 210. The goal of the international correspondent banks in doing so is to make cash management more convenient and efficient for its customers. Two modes of remote access, for accessing, an electronic banking system such as system 202, are usually supported by most of the international correspondent banks: asynchronous dial-up access and internet access. Dial-up access, which usually has the larger base of corporate and institutional users, is usually more reliable and secure than Internet access. Dial-up access also tends to be a more mature and fully tested system as many international correspondent banks have been providing direct dial-up access to their customers for over twenty years. Dial-up access is usually run by a client computer software application that is distributed by the particular international correspondent bank to its customers (often on floppy disk or CD-ROM media) and installed by customers on their desktop Personal Computers.

The more recently introduced Internet access for electronic banking is accessed by customers using web browsers most often running the secure sockets layer protocol commonly used to protect the security of the session information between the international correspondent bank and its customer.

A third mode of electronic banking capability provided by most of the major international correspondent banks are interface tools that support computer software application-to-application interaction between the electronic banking system, such as system 202 in FIG. 3, and enterprise software, such as SAP (TRADEMARKED) or ORACLE (TRADEMARKED) computer software, which is running on the customer side. In this case, the interface tools are already standardized for access by another computer software application making it easier to integrate the electronic banking functions of that international correspondent bank with the central flow control apparatus or system 210. Typically, an international correspondent bank using the third mode of electronic banking capability would only need an adapter (whether SAP (TRADEMARKED), Oracle (TRADEMARKED) or some other standard) to communicate between the central flow control apparatus 210 and the electronic banking host computer software which typically runs on a mainframe computer. A newly announced standard, but which has not yet been implemented to any significant degree at the present, are web services which in theory could allow functions to be implemented on a correspondent bank's internal computer systems and which can be invoked by a remote client application using a TCP/IP connection.

Regardless of the electronic access method provided, there is an appropriate approach for integrating the central flow control apparatus or system 210 with the target international correspondent bank's electronic banking system, such as system 202 as shown by Table 1 which follows:

TABLE 1

| Type of Access Scenarios | Interface Approach Utilized |
|---|---|
| International Correspondent-Bank system 202 Supplies Interface Tools for Enterprise Software | Install an adapter computer software program on the interface processor, such as interface processor 212, compatible with the particular enterprise software to manipulate the messages between the Central Flow Control apparatus 210 and the electronic banking system 202. The underlying message standards and networks that may be utilized may be supplied by S.W.I.F.T. for example. |
| Client Application Running on international Correspondent Bank system 202 Provided PC Software | Automate the user interaction required by the client application to programmatically generate the appropriate keyboard entries and mouse clicks. The automation will robotically (using programmed code and logic) navigate and input information required by the host computer (being accessed by the client application) to identify and interact with the client application, such as user ID information, bank account numbers to access and selection of the desired activity from a menu of options presented and provided for by the client application. Capture and parse the client applications' information output for use by the Applications Layer. |
| International correspondent bank electronic banking system 202 uses Web Browser Electronic Banking | Automate the user interaction required by the correspondent bank's web page to programmatically generate keyboard entries and mouse clicks. The automation will robotically (using programmed code and logic) navigate and input information required by the host computer (being accessed by the web application such as a web browser) to identify and interact with the web page, such as user ID information, bank account numbers to access and selection of the desired activity from a menu of options presented and provided for by the client application. Another approach would be to reverse engineer the correspondent bank's HTML programming so that the messages expected by the correspondent bank's server can be programmatically generated by the Interface Layer. Capture and parse the information output contained in the web pages generated by the correspondent bank for use by the Applications Layer. Web services are another emerging standard which could be used to allow Central Flow Control to access information on the international correspondent bank's system, as well as to order transactions. |

Whichever approach is selected to integrate each correspondent bank's electronic banking capabilities, the interface layer, for example interface processor 212, will need to hide the complexity from the applications layer, for example processor 222 by providing a standard programmable interface—called an interface object—linking the inter-communication between all the correspondent banks such as correspondent bank 202 and the applications processor, for example applications processor 222. These programmable objects, which will have a standard set of commands and responses, will be the tools used by the programmers working on the applications layer. The minimum set of inputs for the interface object should include a code referring to the international correspondent bank such as bank 112 having banking system 202, a code for the participating emerging market bank, such as bank 104 having participating bank processor 290 and its FX-control-protected account number. The interface object should then encapsulate a link to all the attributes of this FX-control-protected account. These attributes include the regular nostro account, such as account 106 of FIG. 2 and investor lockbox account, such as account 118, to which the controlled FX-control-protected account, such as account 114, is associated with. The major functionalities that will be required of the interface-object class, which may be implemented in any object-oriented software programming language such as the Java computer software programming language, are as follows:

TABLE 2

Public Members of the Interface-Obed Class

| Member Names | Type | Purpose |
| --- | --- | --- |
| CorBankCode | Property | Code for the international correspondent bank, such as bank 112 having system 202 to access |
| CorBankName | Property | Name of the international correspondent bank which has been accessed (read only) |
| LocalBankCode | Property | Code for the participating emerging market bank, such as bank 104, having processor 290 which is the beneficiary of the offshore trust |
| LocalBankName | Property | Name of the participating emerging market bank, such as bank 104 having processor 290 which has been accessed (read only) |
| MPAcctNumber | Property | Account number of the Offshore Trust (the FX-control-protected Account, such as account 114) at the international correspondent bank, such as bank 112 having system 202, being accessed |
| NostroAcctNumber | Property | Account number of the regular nostro account, such as account 114, for the participating emerging market bank, such as bank 104, having processor 290 which is linked to the FX-control-protected account, such as account 114. Money transfers are debited to this account. (read only) |
| BalanceQuery | Method | Asks for the current balance of the FX-control-protected Account. Returns deposit balance, available balance, currency code and system time of inquiry. |
| ActivityQuery | Method | Arguments are starting date and ending date for the activity (deposits and withdrawals) involving the FX-control-protected Account. A data array is returned with, at least, the following information: date, amount (positive for debits and negative for credits), transaction number, and description of debit or credit item. |
| TransferToLocalBank | Method | Argument is the amount to be transferred from the FX-Control-Protected Account to the linked nostro account of the participating bank. A code indicating whether the transfer was successful or not is returned. |
| TransferToLockBox | Method | Argument is the amount to be transferred from the FX-Control-Protected Account to the lock box account, such as account 118, for the investors. A code indicating whether the transfer was successful or not is returned. |
| ConnectSuccessful | Event | Fired off when the Object has successfully logged into the system, such as system 202, for the specific international correspondent bank |
| ConnectFailed | Event | Fired off when the Object cannot connect to the international correspondent bank. Argument is a code indicating reason why connection attempt failed. |
| ConnectTerminate | Event | Fired off when a successful connection has been terminated. Argument is a code indicating reason why connection was terminated. |

The "Event" members of the interface object, shown in table 2, above, are needed to control the management of many independent jobs running concurrently on the interface processors, such as interface processors 212, 214, and 216 of the interface layer. The speed of execution of the interface processor, such as processor 212 will mostly depend on the responsiveness of the correspondent bank's electronic banking system to which it communicates, such as system 202, a factor which is beyond the control of the central flow control apparatus 210.

Design-wise, the interface objects can be implemented on an interface processor, such as interface processor 212, as individual computer software applications running on a dedicated computer processor and linked to the outside world through a leased line, the publicly switched telephone network ("PSTN") or the Internet (a link such as 202a), depending on the access medium required by the particular system, such as system 202 of FIG. 3, of the particular international correspondent bank. The computer software programs comprising the applications layer will typically be running on separate dedicated computers, as applications processors 222 and 226 that are locally networked with the interface processors running the interface layer, such as interface processors 212, 214, and 216. Thus the present invention envisions that the central flow control apparatus 210 will really be a cluster of computers, processors or computer processors working together—some running interface layer type jobs and others running applications layer type jobs, and a few running the presentation layer type jobs. These clusters of computers can then be replicated in several data centers around the world, so that a plurality of central flow control apparatus, like apparatus 210 may be provided in the system 200 of FIG. 3, to provide redundancy and reliability for the banking system 200.

The previous discussion focused on the bank accounts that are directly and indirectly owned by the participating emerging market banks in the securitization program. All the participating emerging market banks, such as bank 104 having processor 290 shown in FIG. 3, are actually on one side of the transaction. The other side of the transaction is the emerging market central bank, having a processor 260, shown in FIG. 3. An important part of the structure of the present invention is a master FX purchase agreement whereby the participating emerging market banks, such as bank 104 having processor 290, acting collectively through their offshore trusts, agree to sell foreign currency to the emerging market central bank, such as the central bank having processor 260 and receive local currency as compensation. The emerging market central bank has the flip side of this FX purchase transaction. It receives foreign currency (foreign to the emerging market country, for example, United States dollars) and pays local (emerging market country) currency to the participating emerging market banks. At closing of the securitization, the foreign currency, which is to be received by the emerging market central bank, is assigned to a special purpose vehicle ("SPV" such as SPV 310 in FIG. 4) that will issue debt securities to the investors.

An important aspect of the transaction involves the question of where the foreign currency will be obtained by the offshore trusts (which are acting collectively). The source of such foreign currency will depend on whether or not a state of FX ("foreign exchange") control or other form of capital control exists which prevents foreign currency from being transferred from the emerging market country to an offshore account. During normal times when there is no such obstacle originating from such emerging market country which prevents such transfer, the offshore trusts simply delegate the emerging market central bank to buy the foreign currency promised under the FX purchase agreement from the local FX market operating within the emerging market country. Usually this is a market dominated by the participating emerging market banks themselves. Since there is no transfer restriction, the foreign currency purchased by the emerging market central bank and assigned to investors are remitted by the seller (as ordered by the buyer, the emerging market central bank) to an offshore funding account(s) set up for this purpose with one or more of the international correspondent banks covered by the system. Therefore, the central flow control apparatus 210 will need to have electronic access to this funding account(s) set up for the central bank processor, such as processor 260 of the emerging market central bank, just as it has access to the FX-control-protected accounts, such as account 114, set up for the offshore trusts.

If there are insufficient or no funds available in the funding account, meaning that for whatever reason the emerging market central bank did not transfer (or cause to be transferred) the scheduled and promised foreign currency amount from onshore (meaning under the control of the emerging market country) sources to the offshore (meaning not under the control of the emerging market country) account, then the central flow control apparatus 210 will obtain the foreign currency due to the investor from an offshore source. Instead of the onshore market, the promised foreign currency is taken from the offshore trusts themselves by distributed electronic deductions automatically performed by the central flow control apparatus 210 against the FX-control-protected accounts managed by it, such as FX-control-protected account 114 which may be located in system 202. The central flow control apparatus 210 may manage this account 114 via the communication link 202*a*. The methods and calculations by which deductions will be shared among the various offshore trusts will be carefully defined in the FX purchase agreement itself, and can be enforced by central flow control apparatus 210.

Figure 4:
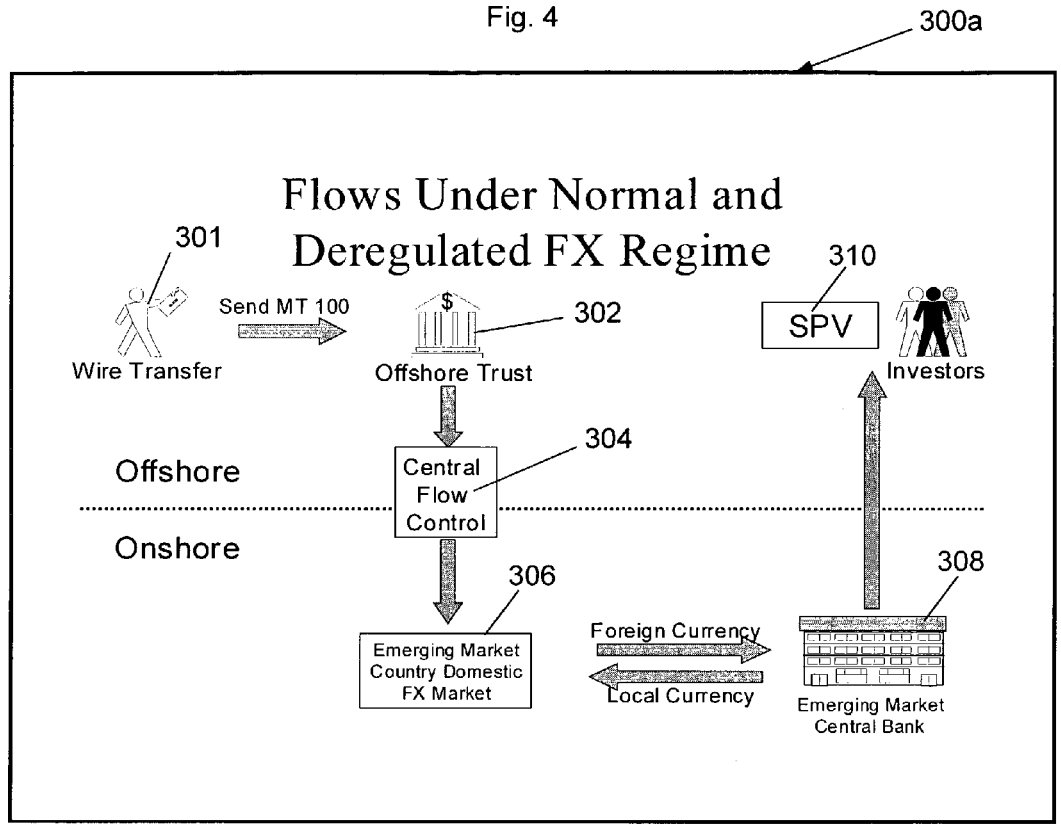
FIG. 4 shows a diagram of the flow of monetary funds under normal circumstances in a banking system in accordance with the first or second embodiments of the present invention.

One way to describe this particular kind of FX purchase agreement, as compared to conventional FX purchase agreements in the market, is that it has a dual-source for foreign currency. The source under the swap will come from either onshore or offshore sources, depending on whether foreign currency is successfully purchased onshore and remitted offshore by the emerging market central bank having a processor, such as the emerging market central bank having processor 260. FIGS. 4 and 5 give an overview of the flow of monetary funds based on two scenarios in accordance with embodiments of the present invention—first, when there is no state of FX control (or capital control) which prevents transfer of funds to foreign investors (i.e. normal conditions where there is a liberalized foreign exchange market) and second, when there is such a condition occurring (or any form of FX control or capital control that prevents the same transfer to offshore investors).

FIG. 4 explains the typical flow of funds between various parties transacting a remittance transaction and also another party which is repaying its debt. In the normal and deregulated FX regime scenario shown in FIG. 4, the following occurs. A participating emerging market bank 301 (which may be the same as bank 104 having the processor 290) transfers monetary funds such as those associated with MT 100 (an electronic message standard defined by S.W.I.F.T. sent by one bank to another where the former informs the latter that funds have been credited to the latter's account and that the latter should credit a customer account for the same amount of the funds) into an offshore trust account 302, which may be the FX-control-protected account 114 at the international correspondent bank 112. The offshore trust 302 is managed by the central flow control apparatus 304 in FIG. 4. The central flow control apparatus 304 can provide funds originating from offshore (foreign to the emerging market country) sources such as wire transfer 301 to an onshore account 306, which may be for example an account on the processor 290 of the emerging market bank 104. As an example, the onshore account 306 may provide a foreign currency, such as U.S. dollars to an emerging market central bank 308, which may be the same as the emerging market central bank having a processor 260 in FIG. 3. The foreign currency (U.S. dollars) may be provided from the onshore account 306 in exchange for anything of value located onshore such as local currency (in this example, Pesos, in a Philippines example, the Philippine currency) provided from the emerging market central bank 308. The emerging market central bank need not purchase the foreign currency that it sends to SPV 310 just before it sends it; it can use foreign currency that it purchased long ago. The emerging market central bank may then send the foreign currency (U.S. dollars in this case) to the SPV 310. The "SPV" is a special purpose vehicle organized offshore (meaning outside the control of the emerging-market country) which is a bankruptcy-remote legal entity whose sole purpose is to issue securities to offshore investors who will provide the securitization financing.

When there is a condition impeding the flow of onshore foreign currency to investors (i.e., FX control or capital control), the central flow control apparatus 210 of FIG. 3 takes over and automatically deducts funds for the SPV 310. These deductions shall be taken directly from the FX-control-protected accounts, such as account 114 of FIG. 2. Moreover, the deduction of foreign currency from the FX-control-protected account, such as account 114 of FIG. 2, does not depend on anyone having to arrive at the legal conclusion that a state of FX control or capital control preventing transfer of foreign currency out of the emerging market country has been declared by the monetary authorities or government of the emerging market country. Non-deposit of the onshore funds into the SPV funding account, as scheduled in the FX purchase agreement, will trigger the "FX control scenario" as illustrated in FIG. 5 below.

Figure 6B:
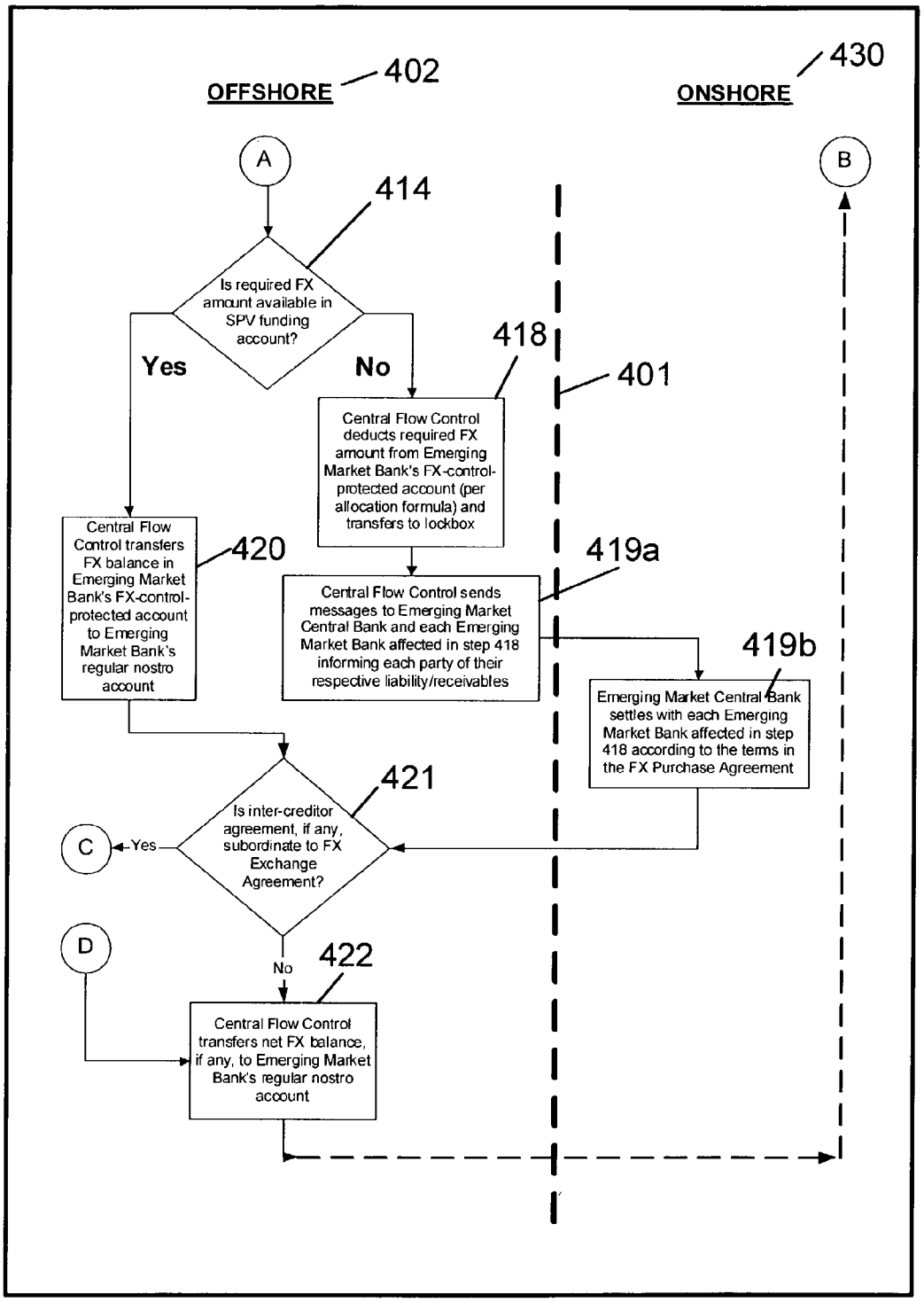

FIGS. 6A, 6B and 6C show a flow chart 400 which describes the processing decisions and steps that the parties and the central flow control apparatus 210 should perform on each business day. The flow chart 400 includes steps in column 402 which typically take place offshore of the emerging market country (meaning outside the legal jurisdiction and control of the emerging market country) and the steps in column 430 which typically take place onshore of the emerging market country (meaning inside the legal jurisdiction and control of the emerging market country. The columns 402 and 430 are separated by dashed line 401. Not every step disclosed in flowchart 400 has to be performed every day but at least one or some steps have to be performed often. The flowchart 400 shown is an ideal sequence of the methods of the present invention although there could be other sequences used which will provide that FX originate from an onshore source, then a test is performed whether such step was actually performed, and if not, the funds in the FX-protected account are used to provide the FX that supposed to originate from the onshore source.

At step 404 a correspondent bank receives FX (or foreign exchange) from non-resident remitters (parties who do not reside in the emerging market country). At step 406, the correspondent bank generates an MT 100 instruction (as previously defined) to the emerging market bank for credit to the customer of the emerging market bank. At step 408, the correspondent bank, such as bank 112 with system 202, receives FX (such as U.S. dollars or other hard currency) from the non-resident remitter. At step 410, the correspondent bank credits the emerging market bank's FX-control-protected account (such as account 114 for the emerging market bank 104, located at international bank 112).

The next step, 411, is actually a decision branch based on whether or not there is an intercreditor agreement in existence, as previously defined, that is relying on the same collateral that is deposited in the FX-control-protected account (such as 114 in FIG. 2). If there is an intercreditor agreement in existence, then this step 411 also checks whether the intercreditor's rights are superior or pari passu to the rights of the offshore investors in the FX purchase agreement. If one or both conditions are false, then the process moves on to step 412. However, if both conditions are true, that is, an intercreditor agreement exists and rights of intercreditors are superior or pari passu to those of the offshore investors, then the process moves to the flowchart described in FIG. 6C.

The purpose of the process in FIG. 6C is to first determine whether there are sufficient funds already available in the lockbox for intercreditor, which is another bank account, to meet the next payment due to the intercreditor. This step is performed in step 440 shown in FIG. 6C. The purpose of the intercreditor funding account is to hold funds reserved for the next payment due to the intercreditor. Funds that have been deposited to the intercreditor funding account could have been deposited there by the emerging market bank who is a party to the intercreditor agreement pursuant to action required by that agreement. On the other hand, previous iterations of the flowchart 400 could have also caused funds to be deposited into the intercreditor funding account. If there are sufficient funds in the intercreditor funding account, the central flow control apparatus 210 will not need to deduct anything from the FX-control-protected account (such as 114 in FIG. 2) and processing will move to the next step (shown as a branch to circle D in FIG. 6C. However, if there are insufficient funds, the central flow control apparatus 210 will perform step 442 during which it will deduct an amount of FX ("foreign exchange") from the balance in the FX-control-protected account (such as 114 in FIG. 2) as provided in the intercreditor agreement. Usually this will be all the available funds in the FX-control-protected account 114 up to the deficiency in the intercreditor funding account, meaning the shortfall between what is due on the next payment to the intercreditor and what is available in that account. Depending on the provisions of the intercreditor agreement, the deducted funds will then be transferred to the lockbox for the intercreditor (such as 119 in FIG. 2), if one is set up at the same bank as the FX-control-protected account (such as 114 in FIG. 2), or to the intercreditor funding account.

Next, the central flow apparatus 210 of FIG. 3, at step 412, determines the balance in the SPV funding account, such as the funding account SPV 310 of FIG. 4. This SPV funding account 310 is held in the particular correspondent bank, such as bank 112 within system 202. At step 414 shown in FIG. 6B, the central flow apparatus 210 of FIG. 3 determines if there is a sufficient amount of foreign exchange available in this funding account. The sufficient FX amount for any period during the securitization financing is determined by the documents, which includes the FX purchase agreement, and typically represents the bond coupon payments to investors plus administrative, servicing and other fees needed to support the securitization financing.

If there is a sufficient amount available, step 420 is executed wherein the central flow control apparatus 210 transfers the FX balance in the emerging market bank's (such as bank 104 of FIG. 1 having a processor 290) FX-control-protected account (such as account 114) which is at the international correspondent bank, such as bank 112 having a system 202, to a regular nostro account (such as account 106 if FIG. 1). Following step 420, step 421 is executed, which is a determination of two questions: whether an intercreditor agreement exists and whether such intercreditor agreement provides that intercreditors are subordinate to the creditors under the FX purchase agreement as far as claims on the collateral in the FX-control-protected account (such as 114 in FIG. 2) are concerned. If the answer to both questions is yes, then the process will enter the same steps previously described as steps 440 and 442 in FIG. 6C. Otherwise, the process will move to step 422 during which any amount remaining in the FX-control-protected account (such as 114 in FIG. 2) will be transferred by the central flow control apparatus 210 to the regular nostro account, such as 106, of the respective emerging market bank.

If there is not a sufficient FX amount available at step 414 then step 418 is executed. At step 418, the central flow control apparatus 210 deducts the required FX amount from the emerging market bank's (bank 104) FX-control-protected account (per allocation formula as has been negotiated and defined in the FX purchase agreement between the various parties involved in the financing), such as account 114 in FIG. 2, in system 202 of bank 112.

Step 419a is executed next during which the central flow control apparatus 210 sends messages to the emerging market central bank and to the emerging market bank from which FX was deducted under step 418. The purpose of step 419a is to inform each of the merging market banks affected in step 418 so each of those banks can be aware of how much FX was deducted from their respective offshore trust (specifically from the offshore trust's FX-control-protected account), and so that those banks can expect how much the emerging market central bank will compensate them for. Next is step 419b which is performed onshore. The emerging market bank, which had incoming FX diverted for the account of the emerging market central bank, is compensated for this diverted FX at step 419b. The manner at which that bank is to be compensated is normally provided as a part of the FX purchase agreement. A popular settlement procedure will be in three sub-steps as follows: At the first sub-step, each affected emerging market bank which had FX diverted through the deduction in step 418 will be paid in local currency for the amount of the FX deducted. In the second sub-step, the emerging market central bank will cause that emerging market bank to exchange its local currency payment for onshore FX. In the third and final sub-step, the emerging market central bank will obtain the FX to be given to the emerging market bank affected in step 418 from the other banks which have not been affected under step 418 without regard as to whether or not the bank affected in step 418 participated in the FX purchase agreement. The end purpose of these three sub-steps is to ensure that in case FX control is declared causing FX to be diverted away from any bank's regular nostro account, such as 106, participation by that bank in the FX purchase agreement will usually be immaterial to its ultimate liquidity and FX position after step 419*b* is performed.

After step 419*b* is performed, the processing will move to step 421 which has already been previously described as the step that also follows step 410. Steps 420 (described in the paragraph below) and 419*b* are actually alternate scenarios that lead into step 421. Following the decision in step 421, steps 440 and 442 will be executed, and will then feed to step 422.

At step 422 the central flow control apparatus 210 transfers net FX balance, if any to the emerging market bank's regular nostro account, such as account 106 in FIG. 2 in system 202 of bank 112. (System 202 is located offshore with respect to emerging market country, meaning that this system is outside the control and jurisdiction of the government of the emerging market country).

On the other hand, if there is sufficient FX amount available at step 414, then step 420 is executed. At step 420, the central flow control apparatus 210 transfers the FX balance in emerging market bank's (such as bank 104) FX-control-protected account (such as 114 of FIG. 2) to that same emerging market bank's regular nostro account such as 110 in FIG. 2 located in the same correspondent bank such as 112 of FIG. 2. Following step 420, the process moves to step 421 where a decision is made according to the conditions previously described above. If the answers to both conditions is yes, then the processing moves to steps 440 and 442 as previously described.

Onshore within the emerging market country in column 430 (meaning under the legal jurisdiction of the emerging market country), at step 431*a*, a decision is made by the emerging market central bank depending on whether there is a condition existing onshore that prevents the emerging market central bank from transferring FX offshore, in this example, to the SPV funding account (owned by an SPV such as 310). If there is such a condition preventing such transfer, no other step will be accomplished onshore and the processing will be handled offshore as described in step 412.

On the other hand, if there is no condition that prevents the emerging market central bank from transferring FX to the SPV funding account 310, the process following step 431*a* is to determine how to send this foreign exchange. The emerging market central bank can choose the process in step 431*b*, in which case it transfers FX that it already owns (for example, held in the international reserves of the emerging market country) or it can choose the process in step 432, in which case the emerging market central bank purchases FX from onshore parties willing or compelled to sell FX to it. Following step 432, the emerging market central bank at step 434 instructs the seller of the FX to transfer the FX to the SPV funding account 310. Steps 431*b* and 432 are not mutually exclusive choices for the emerging market central bank. It can purchase some or all of the FX that it needs to send to the SPV funding account 310, which is located offshore, using either or both steps 431*b* and 432. After the emerging market central bank sends FX offshore, the method then next proceeds to step 412 and the steps, which follow as appropriate and as previously described.

The final layer of the central flow control apparatus 210, which is the presentation layer, serves up the reporting information required by the various constituencies of the financing. These constituencies are the central bank via processor 260, the bond trustee via processor 270, the rating agencies, for example via processor 280 for one rating agency, and all the participating emerging market banks, such as for example via processor 290 for emerging market participating bank 104. The presentation Layer can be implemented by computer software programmed or used on presentation processor or web server 240. The presentation layer can use web technologies such as HTML, XML and Java to dynamically present the relevant data to the constituencies on their regular desktop computer using a standard web browser. However, unlike public web applications, access to the presentation layer is restricted to the legitimate constituencies, who are permitted to connect only through a secure private network, such as network 250 which may be provided by private data networks such as that of GENERAL ELECTRIC (TRADEMARKED). Access to reports will not be available through the publicly accessible Internet. Constituents may also need to validate their identity with secure digital signatures (using public key infrastructure technology adopted by a certification authority such as VERISIGN (TRADEMARKED) to be agreed upon by the emerging market central bank and the participating emerging market banks) before they can login and authorize transactions. Authorization of transactions is only applicable for those parties linked through the central flow control apparatus 210 who are permitted to transact. Digital signatures may require a physical medium (mini CD-ROM) in the constituent's possession, as well as knowledge of a password, in order to login. The applications layer can require counter digital signatures for sensitive transactions that require several officers to authorize, such as moving money from the SPV funding account, such as 310 in FIG. 4, to the fiscal agent's master account for distribution to the securitization investors or from the various lockbox accounts at the various correspondent banks to the same fiscal agent's account. The fiscal agent is a financial institution appointed in the securitization financing, and which is responsible for directing payments to each investor in the securitization investor.

Figure 7:
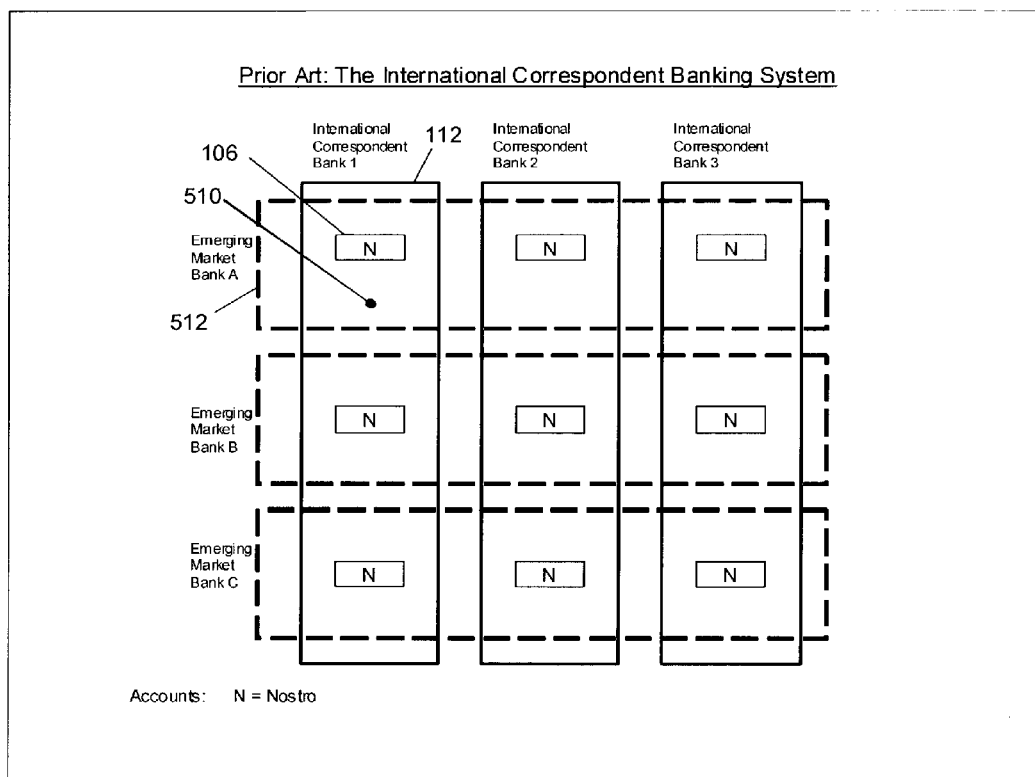
FIG. 7 shows a representation of the relationships between emerging market banks and international correspondent banks that exist in the prior art.
Figure 8:
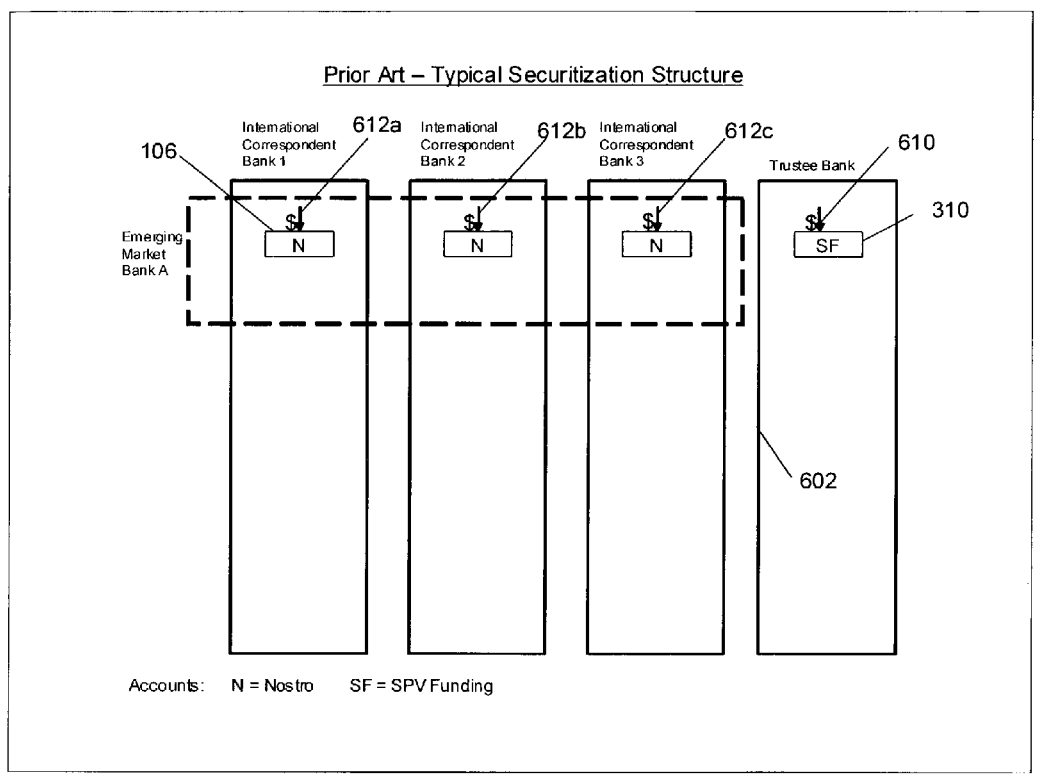
FIG. 8 shows a representation of the prior art where the use of future flow securitization is limited to a single emerging market bank.
Figure 9:
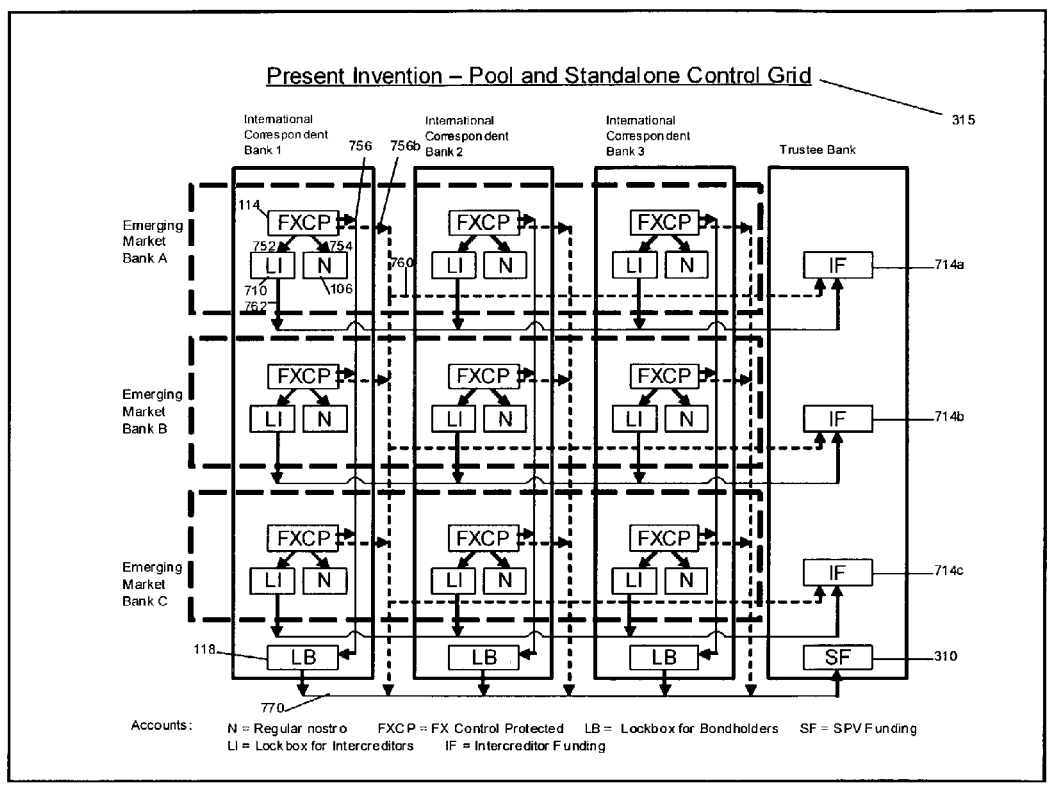
FIG. 9 shows the location of accounts within various banks and the paths through which funds can be transferred using methods of one or more embodiments of the present invention.

FIGS. 7, 8 and 9 illustrate the many-to-many relationships among international correspondent banks and emerging market banks. In each of FIGS. 7, 8 and 9 there are horizontal rectangles in dashed lines, such as 512 in FIG. 7, each of which represent an emerging market bank, and there are vertical rectangles in solid lines such as 112 each of which represent international correspondent banks. Each of the intersections of horizontal rectangles representing emerging market banks and vertical rectangles representing international correspondent banks are referred to in this explanation as a cell such as represented by the square area 510 bounded by a solid line on the sides and dashed lines on the top and bottom. In each of FIGS. 7, 8 and 9, there are three emerging market banks and three international correspondent banks so that there are nine cells such as 510 in FIG. 7. The present invention can handle any number of international correspondent banks and any number of emerging market banks so that it can handle any number of cells such as 510. In reality, not every international correspondent bank will have a relationship with every emerging market bank handled by the present invention; therefore, some of the cells such as 510 may actually be empty, which means that no accounts have been established in that particular international correspondent bank with respect to that particular emerging market bank. However all the cells such as 510 which are shown in each of FIG. 7, 8 or 9 have accounts in them so as to explain the methods by which the present invention manages the interactions with each other by the accounts within each cell, such as 510, as well as interactions with accounts outside the cells such as 510.

FIG. 7 shows the prior art with respect to the many-to-many relationships between emerging market banks and international correspondent banks wherein each of the former maintains a nostro account such as 106 in FIG. 7 in each of the latter. FIG. 8 shows the prior art after an emerging market bank has established a future flow securitization. In the prior art, future flow securitization has been limited to a single bank level. In the typical prior art structure as illustrated by FIG. 8, the international correspondent banks such as international correspondent banks 1, 2 and 3 of an emerging market bank, such as emerging market bank A, agree to deposit all future flow payments that would have been due to the emerging market bank, such as emerging market bank A, to an SPV Funding Account such as 310, established in a trustee bank such as trustee bank 602 shown in FIG. 8. After deposits such as 610, shown in FIG. 8, to an SPV Funding Account such as 310, accumulate enough FX funds in that account to meet the next debt service payment to the investors in the securitization, the international correspondent banks such as international correspondent banks 1, 2 and 3, are instructed to stop sending future flow payments as deposits to an SPV Funding Account such as 310, and to instead start depositing future flow payments to the nostro accounts, such as account 106, of that emerging market bank as shown by deposits 612a, 612b and 612c. When the next coupon period starts, the cycle begins all over again and the international correspondent banks such as international correspondent banks 1, 2 and 3 are instructed to make deposits such as deposit 610 shown in FIG. 8, to SPV Funding Account such as 310.

One reason why one or more embodiments of the present invention are different from the prior art is because the securitization program enabled by the present invention goes beyond a single bank and can be established for two or more emerging market banks such as emerging market banks A, B and C in FIG. 9. Also, unlike the prior art, the functionality of trapping offshore funds such as the function performed by the SPV Funding Account such as account 310, are not centralized in one trustee bank as in the case of the prior art. Under the present invention, it is possible to establish an FX-control-protected account to trap the flows offshore such as 114 in each cell representing a relationship between an emerging market bank such as emerging market bank A in FIG. 8 and an international correspondent bank such as international correspondent bank 1 in FIG. 9. It is also possible to establish a lockbox account for intercreditors such as lockbox account (LI) 710 shown in FIG. 9, if the emerging market bank such as emerging market bank A has undertaken a standalone securitization program by itself side by side with a securitization program pooling two or more emerging market banks such as emerging market banks A, B and C. Using the present invention, it is possible to establish a lockbox account for bondholders such as lockbox account 118 shown in FIG. 9 at each of the international correspondent banks which will be managed within the Control Grid such as 315 in FIG. 9. It is also possible to establish an intercreditor funding account such as intercreditor funding accounts (IFs) 714a, 714b and 714c, shown in FIG. 9, at a trustee bank to correspond to an emerging market bank such as emerging market banks A, B and C respectively, if that emerging market bank is party to an intercreditor agreement. The present invention can transfer foreign exchange ("FX") from the FX-control-protected account such as 114, to the lockbox account for bondholders such as lockbox account ("LB") 118, shown in FIG. 9, through a path such as path 756. From there, FX in the lockbox account for bondholders such as 118 can be transferred to an SPV funding account, such as 310, shown in FIG. 4, through a path such as path 770. An alternative path by which the present invention can send FX from the FX-control-protected account, such as 114, to the SPV funding account, such as 310, is through a path, such as 756b, and then through a path such as path 770. The present invention can readily transfer FX from the FX-control-protected account such as 114 to the nostro account such as 106 via path 754. If there is a lockbox for intercreditors such as lockbox ("LI") 710 within the cell representing the relationship of international correspondent bank, such as international correspondent bank 1 with an emerging market bank such as emerging market bank A, the present invention can transfer foreign exchange ("FX") to the lockbox such as lockbox 710 via a path such as the path 752. From the lockbox, such as the lockbox 752, the present invention can send FX to the intercreditor funding account such as 714a via the path such as the path 762. An alternative path for FX originating from FX-control-protected account, such as 114, to be transferred to intercreditor funding account such as 714a is via path such as path 756b that will then proceed through a path, such as path 760 for deposit to an intercreditor funding account such as intercreditor funding account 714a in a trustee bank. The sequence of transfers of FX between and among accounts via the paths disclosed are determined by the rules established for the securitization program such as the actions and decisions in flowchart 400 shown in FIGS. 6A, 6B and 6C.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

Figure 10:
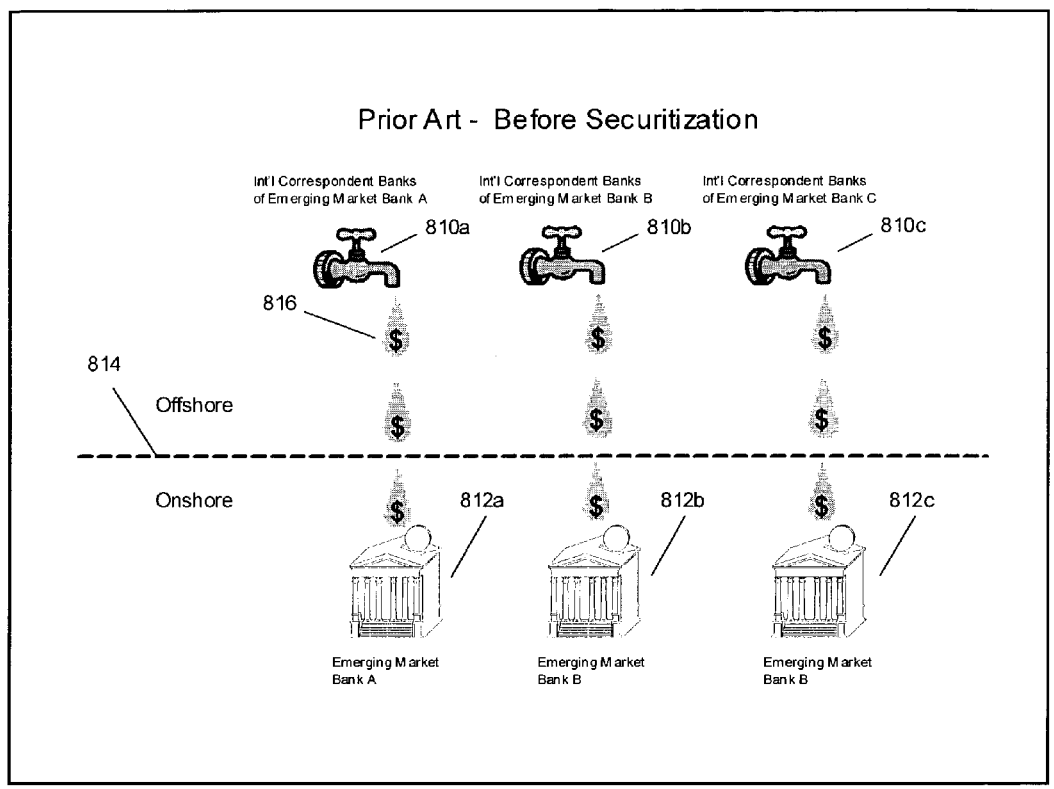
FIG. 10 shows a diagram with symbols demonstrating the prior art regarding future flows flowing from international correspondent banks to emerging market banks
Figure 11:
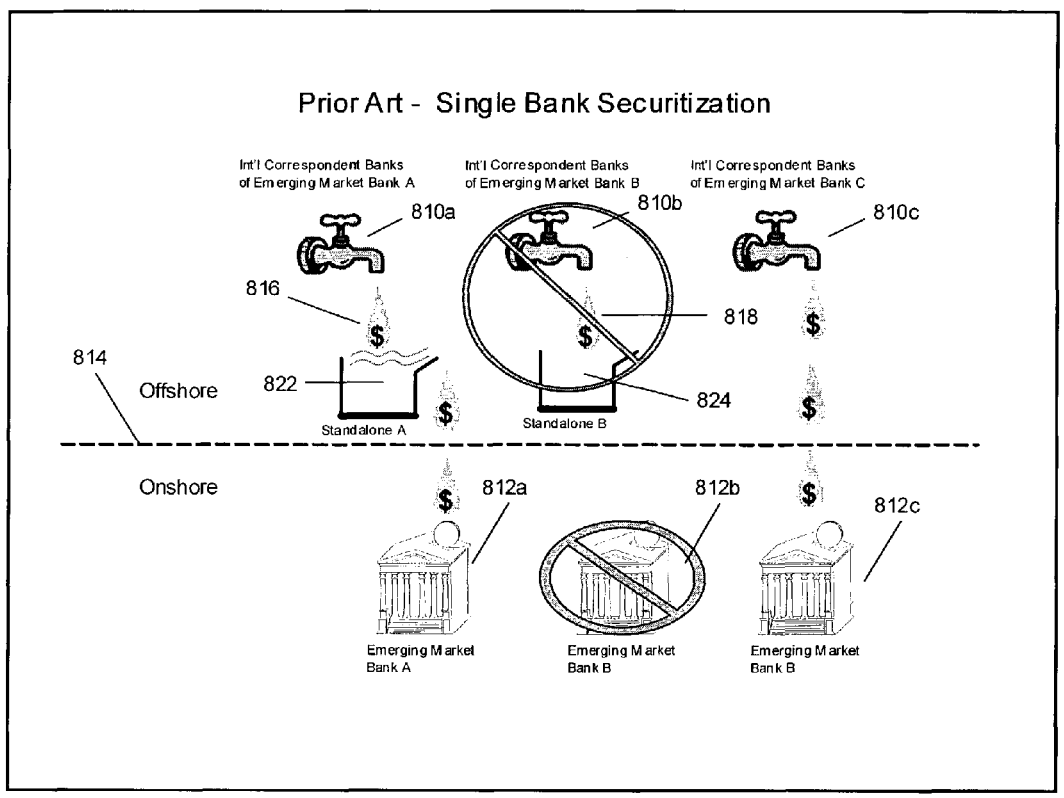
FIG. 11 shows a diagram with symbols demonstrating the prior art regarding a single bank securitization of its future flows
Figure 12:
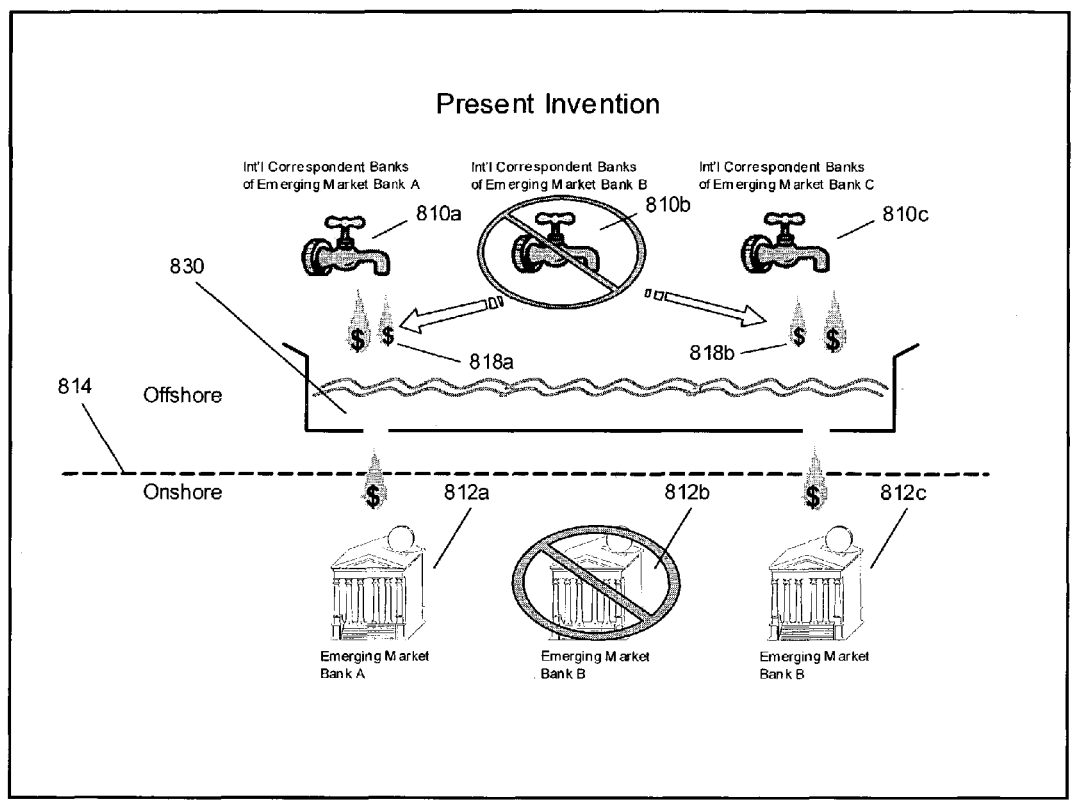
FIG. 12 shows a diagram with symbols demonstrating an embodiment of the present invention

FIGS. 10, 11 and 12 together explain the differences of one or more embodiments of the present invention from the prior art and the benefits of one or more embodiments of the present invention by using diagrams which include symbols. FIG. 10 represents the prior art, before securitization. The international correspondent banks are represented by faucets in the diagram such as shown by 810a, 810b and 810c. The image of a faucet is simply an icon representing the function of international correspondent banks such as 810a, 810b and 810c in generating financial future flows such as 816 for an emerging market bank such as 812a. In reality, each emerging market bank will probably have several international correspondent banks, not just one each as is shown in FIG. 10. Financial future flows are represented in the diagram as drops such as 816. FIG. 10 shows the normal course of flows as they originate from the international correspondent banks such as 810a, 810b and 810c and flow to the emerging market banks such as 812a, 812b and 812c respectively. The dashed line 814 represents the division of onshore and offshore jurisdiction. The area above dashed line 814 is meant to indicate offshore or outside the jurisdiction of the emerging market country and the area underneath dashed line 814 indicates onshore meaning within the jurisdiction of the emerging market country.

FIG. 11 shows how a single bank securitization works. Single bank securitizations were the only form of future flow securitizations known in the prior art. The single bank securitization is established by an emerging market bank such as an emerging market bank 812a establishing an offshore trust such as that represented by 822 in FIG. 11. The purpose of such entity is to trap the future flows such as 816 that would be received by emerging market bank such as 812a. The trapping of future flows in an entity such as 822 permits a financing for an emerging market bank such as 812a because the future flows trapped such as 816 can be used to collateralize a financing for the emerging market bank such as 812a. Because the future flows are trapped offshore, as represented by the offshore trust such as 822 being set up above dashed line 814, the financing which is collateralized by future flows in offshore trust such as 822 can exceed the credit rating assigned to the emerging market government. In so doing, the cost of financing could be significantly lower than financing that is directly obtained by an emerging market bank such as 812a.

An offshore trust, such as 824, which was set up for an emerging market bank such as 812b, shows what can occur when an emerging market bank such as 812b ceases to operate. In such event, an international correspondent bank, such as 810b, will no longer generate future flows for emerging market bank such as 812b. Usually, no one will send money to a bank that is out of business. Therefore, investors in a securitization collateralized by future flows in an offshore trust entity such as 824 will no longer have any collateral from which to recover their investment. The success of a single bank securitization depends very much on the strength of the emerging market bank such as 812b, which established the financing, to continue operating as a going concern in the future.

FIG. 12 shows how the present invention, in one or more embodiments, is different from the single bank securitizations in the prior art such as shown by 822 and 824 in FIG. 11. The present invention, in one or more embodiments, permits a pooling of future flows from several emerging market banks such as 812a, 812b and 812c in an offshore trust such as 830. Even in the event that one of the emerging market banks ceases to operate in the future, as is represented by an emerging market bank such as 812b in FIG. 12, the future flows such as 818a and 818b in FIG. 12 can still be trapped by an offshore trust such as 830. Some or all of the future flows that would have flowed to an emerging market bank that is no longer operating such as 812b in FIG. 12 would now be sent by the remitters such as 301 in FIG. 4 to the surviving emerging market banks such as 812a and 812c through their international correspondent banks such as 810a and 810c. These re-routed flows are shown in FIG. 12 as additional flows such as 818a and 818b that are now directed to emerging market banks such as 812a and 812c. The present invention makes possible the pooling of future flows from many or even all of the emerging market banks within an emerging market country, as accomplished by an offshore trust such as 830. The pooled collateral in an offshore trust such as 830 is thus more reliable and secure than the collateral in a single bank securitization such as 822 in FIG. 11 because the offshore trust such as 830 is protected from failure of any single emerging market bank, such as 812b.

I claim:

1. A method for financing future flows comprising:

obligating an emerging market central bank of an emerging market country to deposit funds pursuant to a legal contract between said emerging market central bank, at least two emerging market banks, an offshore trust, and an investor, wherein said offshore trust owns future flow receivables that were previously transferred to said offshore trust by at least one of said at least two emerging market banks;

determining whether said emerging market central bank caused said funds to be deposited for said investor's benefit;

transferring future flow funds owned by said offshore trust for said at least two emerging market banks' benefit, in case the answer to the determination is affirmative;

depositing future flows funds originating offshore with respect to the emerging market country for said investor's benefit, in case the answer to the determination is negative, wherein said future flow funds, prior to said step of depositing, were designated to be received by said at least two emerging market banks in said emerging market country; and causing said emerging market central bank to pay funds for said at least two emerging market banks' benefit, wherein said funds that are caused to be paid by said emerging market central bank represent compensation for said future flow funds deposited for said investor, and further wherein said compensation is an obligation of said emerging market central bank under said legal contract.

2. The method of claim 1, further comprising crediting in local currency of the emerging market country, one of the at least two emerging market banks which were designated to receive the future flow funds prior to the depositing for the investor;

causing the emerging market central bank to cause the conversion of the amount credited in local currency of the emerging market country into a foreign currency of a country other than that of the emerging market country;

causing the emerging market central bank to obtain a first amount of the foreign currency from a plurality of banks chartered within the emerging market country without regard as to whether the plurality of banks chartered within the emerging market country participated in the method in claim 1.

3. A method comprising, holding the financial instrument of collateralized by rights of said investor in claim 1.

4. The method of claim 1, wherein said legal contract is an FX Purchase Agreement.

* * * * *